United States Patent [19]

Treleven

[11] Patent Number: 5,010,659
[45] Date of Patent: Apr. 30, 1991

[54] INFRARED DRYING SYSTEM

[75] Inventor: Robert E. Treleven, Oneida, Wis.

[73] Assignee: W.R. Grace & Co.-Conn., New York, N.Y.

[21] Appl. No.: 104,895

[22] Filed: Sep. 8, 1989

[51] Int. Cl.⁵ .............................................. F26B 3/32
[52] U.S. Cl. .......................................... 34/41; 34/48; 34/155
[58] Field of Search ................. 34/41, 48, 7, 155, 156; 219/388, 405, 411, 412, 413

[56] References Cited

U.S. PATENT DOCUMENTS

| | | | |
|---|---|---|---|
| 3,815,254 | 6/1974 | Mills | 34/41 |
| 4,501,072 | 2/1985 | Jacobi, Jr. et al. | 219/411 |
| 4,514,913 | 5/1985 | Stephansen | 34/41 |
| 4,590,685 | 5/1986 | Roth | 34/41 |
| 4,594,795 | 6/1986 | Stephansen | 34/41 |
| 4,693,013 | 9/1987 | Pabst et al. | 34/41 |
| 4,698,767 | 10/1987 | Wensel et al. | 219/388 |
| 4,809,608 | 3/1989 | Wolnick et al. | 34/41 |

Primary Examiner—Henry A. Bennett
Assistant Examiner—Denise L. F. Gromada
Attorney, Agent, or Firm—Hugh D. Jaeger

[57] ABSTRACT

An infrared drying system for monitoring the temperature, moisture content, or other physical property at particular zone positions along the width of a traveling web, and utilizing a computer control system to energize and control for finite time periods a plurality of infrared lamps for equalizing physical property and drying the web. The infrared drying system is particularly useful in the graphic arts industry, the coating industry and the paper industry, as well as any other applications requiring physical property profiling and drying of the width of a traveling web of material. The infrared drying system profiles a physical property across the width of the web by a sensor head which travels on a belt supported above the web, and inputs the information into a computer to generate signals corresponding to the measured physical property for each particular segment portion along the width of the web above or below a setpoint. A control computer generates signals corresponding to the particular segment portion of the web and the particular power to be applied to heat that segment portion of the web. A lamp control computer controls lamps in opposing lamp units, through power controller signals for energizing individual infrared heating lamps for finite time periods during each power cycle for drying the traveling web.

12 Claims, 14 Drawing Sheets

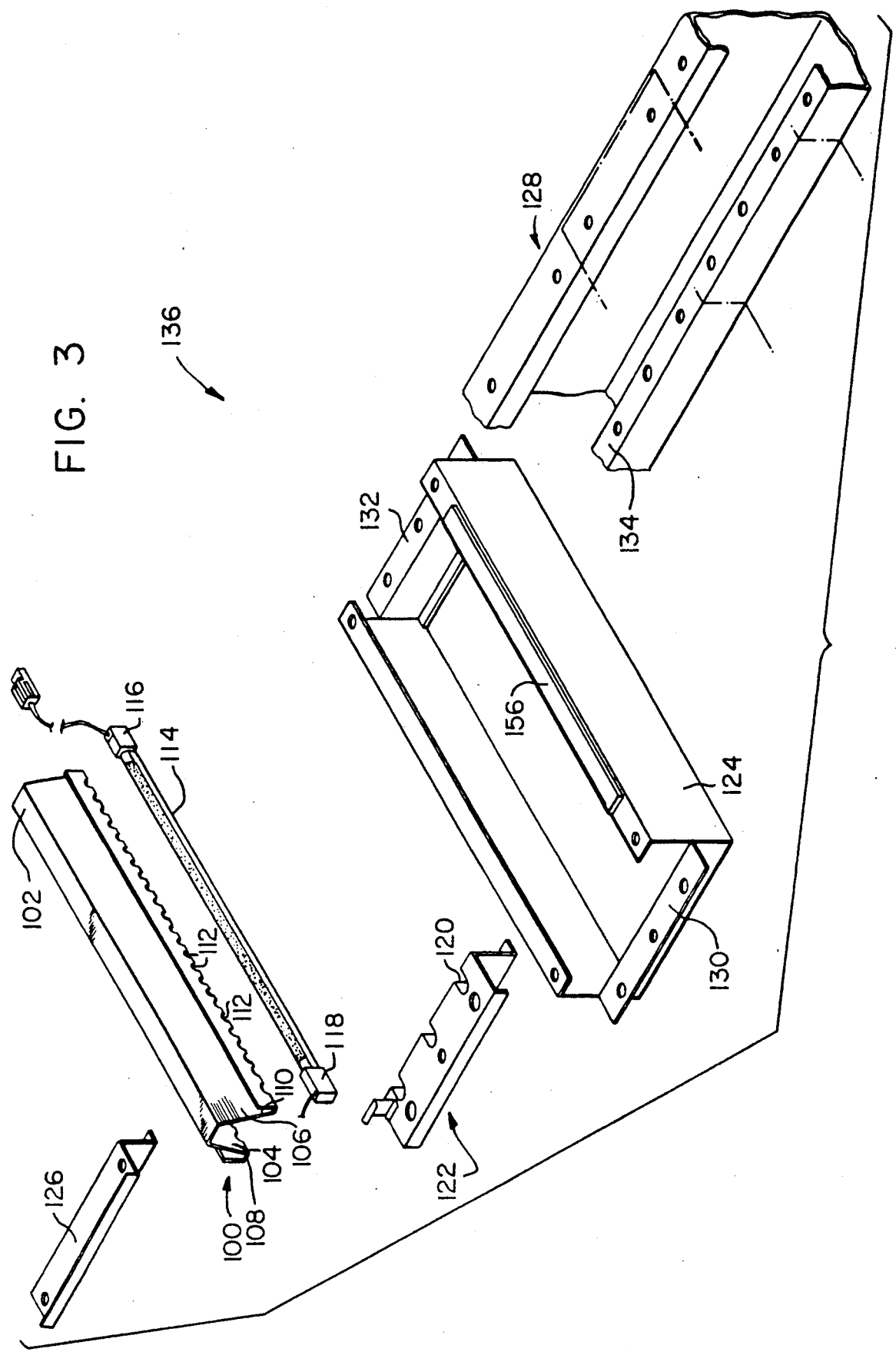

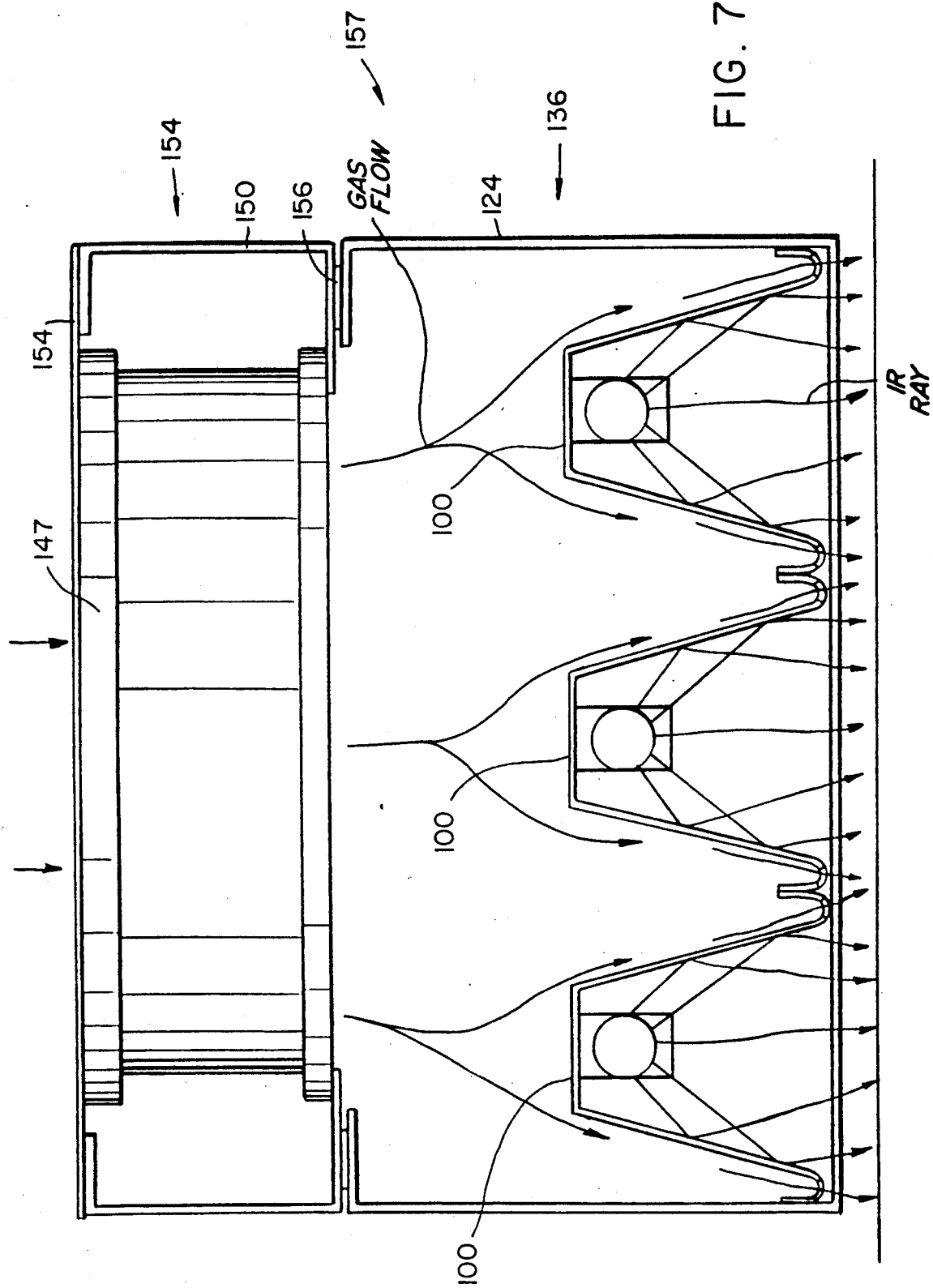

INFRARED DRYING SYSTEM

CROSS REFERENCES TO CO-PENDING APPLICATIONS

The present invention pertains to Ser. No. 203,138, filed June 7, 1988, entitled "Ultraviolet Airbar", and Ser. No. 203,076, filed June 7, 1988, entitled "Infrared Airbar", assigned to the same assignee as the co-pending patent application.

BACKGROUND OF THE INVENTION

1. Field of the Invention

The present invention pertains to an infrared drying system, and more particularly, pertains to an infrared drying system utilizing a temperature sensor, moisture sensor, or other physical property sensor connected to a computer for generating moisture content and position signals across the width of a traveling web of material with respect to a set point, and controlling infrared lamps over predetermined time intervals of a power cycle for drying the web.

2. Description of the Prior Art

Prior art infrared drying systems have failed to provide for selective drying of a traveling web of material over predetermined time periods. Prior art systems have heated an entire traveling web or overlapping positions of the entire traveling web rather than selectively heating a particular portion or zone of a traveling web for a predetermined finite interval of time, particularly for time intervals of a power cycle.

The use of infrared radiation to dry webs is known. U.S. Pat. No. 4,693,013 to Pabst et al. discloses an infrared dryer for drying fabric webs. The radiators can be pivoted into a "waiting position" to direct the emitted radiation away from the web so that they can remain fully energized without burning the web once the web is dried, or without burning the web if it stops moving.

U.S. Pat. No. 4,015,340 to Treleven discloses ultraviolet radiating assemblies. Ultraviolet mercury quartz lamps are received within an elongated reflector having a generally elliptically shaped inside surface cross-section to focus the emitted light. The reflector includes a plurality of cooling fins. The reflector and lamps are supported by a reflector carrier, which is then slidably mounted in a lamp module. The module includes flat rectangular metal frame heat exchangers to assist in removing heat from the modules. The modules are encased in a housing having an exhaust chamber attached to a fan to pull air through the housing which also cools the components therein.

Typical prior art reflectors have poor resolution, in that they do not block the light between adjacent lamps. Thus, too large of a dissipation pattern of light results. Light from one lamp can affect areas four or five zones away. Controlling the drying of specific areas of the web by independently controlling individual lamps is extremely difficult where such a large dissipation pattern is present. The shape of the reflector is also important in avoiding reflector material degradation, including melting of the reflector.

The present invention overcomes the disadvantages of the prior art by providing an infrared drying system which senses the physical property value across the width of a traveling web and heats the traveling web with a module or unit of modules of infrared heaters to control the moisture or other physical property in the web according to an algorithm.

SUMMARY OF THE INVENTION

The general purpose of the present invention is an infrared drying system for sensing the temperature, moisture, or other physical property across the width of a traveling web, generating amplitude content signals with respect to the sensor traveling across the width of the traveling web, processing these signals, and generating signals to control power level signals for specific portions of the traveling web for predetermined time intervals, and controlling a plurality of infrared lamps on opposing sides of the web through power controllers to dry the traveling web.

According to one embodiment of the present invention, there is provided an infrared drying system including a traveling web of material which travels past a moisture monitor on an endless belt reciprocating across the width of a web and monitoring moisture, especially above a setpoint. There can be one or more moisture sensors on the belt for monitoring the moisture. This information is received by a monitoring computer to generate moisture content signals with respect to the signal positions of the moisture sensor over a particular portion of the traveling web. These signals are received by a control computer which generates power level signals for infrared lamps for particular positions, portions or zones for the traveling web of material. These signals are received by the lamp control computer which controls individual power modules for switching power to the infrared lamps. The infrared lamps can be individual reflectors, modules such as three reflectors, or units such as four modules with each module having three reflectors. Generally, the moisture sensors and the infrared lamps are in close proximity with respect to each other about the traveling web.

One significant aspect and feature of the present invention is an infrared drying system which utilizes infrared heating modules which are switched over particular time periods during each cycle of three-phase power.

Another significant aspect and feature of the present invention are infrared lamps which are switched by a lamp computer through individual power modules which provides cost efficient switching of the infrared lamps.

A further significant aspect and feature of the present invention is an infrared drying system which provides for controlling temperature, moisture, or other physical property across the width of a traveling web. The system can either be a closed loop feed back system or an open loop feed back system for the control of the physical property above or below a predetermined setpoint.

Other significant aspects and features of the present invention include infrared lamp power levels which are controlled by computers located in an electrical cabinet conveniently positioned to the sensor cabinet. The computer controls each lamp with 16 power levels by way of example, for maximum web profile control. The power control modules are cost efficient. Any lamps and fuses can be tested continuously by the control computer to alert an operator if a failure occurs. Thermal switches and pressure switches can protect the heating unit from air flow failure. Safety interlocks can turn off power to the lamps when the traveling web is not moving. Each electrical control cabinet can control up to 48 or more infrared lamps and the module design provides for expansion by way of example.

Having thus described the embodiments of the present invention, it is a principal object hereof to provide an infrared drying system for energizing selected infrared lamps positioned across the width of a traveling web of material over predetermined time periods of power cycles for drying the traveling web.

One object of the present invention is computer controlled infrared lamps which produce uniform drying across the web. A complete closed loop or open loop drying system is provided by the teachings of this disclosure. The operator console is user friendly. Self-testing is run continuously on the profiling system. Safety interlocks protect operators and the profiling system. The infrared heating units can be installed either stationary or retractable from the web. Retraction can be either a planar or clamshell configuration, operated by electric motors or pneumatic air cylinders as illustrated. Solvent is collected in the dryer, not in the infrared heating unit. Module design makes maintenance very easy. Lamps can be replaced either as a module or a single lamp.

Another object of the present invention is a unique infrared lamp reflector which provides the highest resolution of infrared lighting. This prevents hot spots which could damage the finish of the coating. The reflector provides web support and prevents mechanical interference. Infrared heating units and electrical cabinets for the computers and power controllers are modular to enable building a system that fits individual customer requirements. Web width, space limitations and special applications can be accommodated. The infrared lamp section can be used as a dryer booster without the profile monitor and independently computer controlled.

A further object of the present invention is an infrared heating unit which is modular and expandable as required. A unique infrared lamp reflector provides the highest resolution of infrared lighting. Heating units can be placed in series, before or after the dryer, or any combination depending upon the application. Infrared heating units can be used on both sides of the web or only one side. A single heating unit with lamps on both sides of the web can have 2000 watts/inch across the machine. The heating unit also has a self-contained cooling system. The infrared lamps are 2000 watts each and can have a minimum lamp life of 5000 hours. The reflector design blocks the light between adjacent lamps. This prevents light from effecting the web 4 or 5 zones away from the lamp that is illuminated. The reflector provides web support on shut down via air distribution and mechanical interference. Combined reflector cooling and impingement air contribute to increased efficiency. The infrared lamps are computer controlled.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 3 illustrates a perspective view of an infrared lamp and reflector;

FIG. 7 illustrates infrared ray and gas flow through the infrared heating unit;

Figure 9:
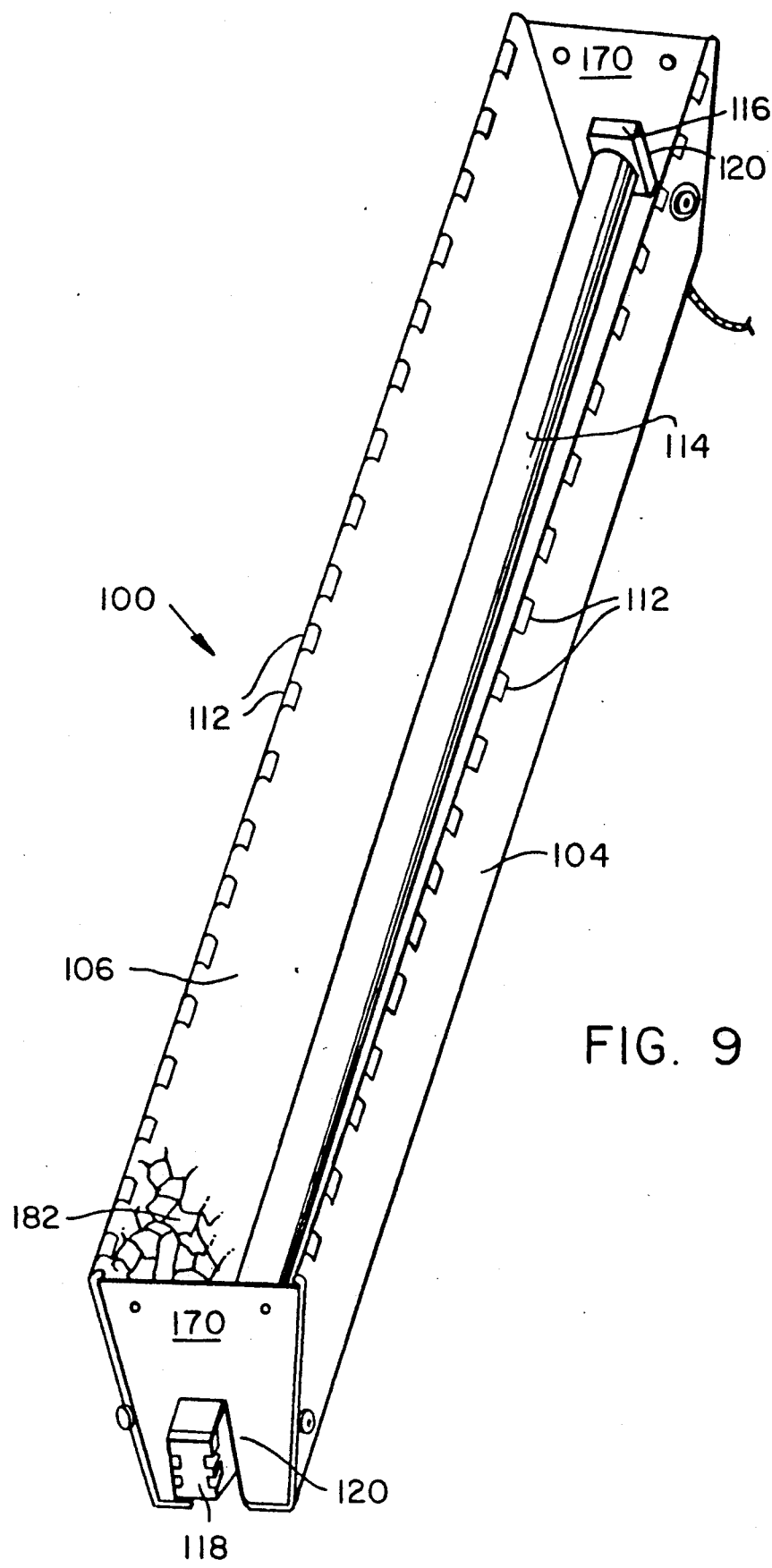
Figure 10:
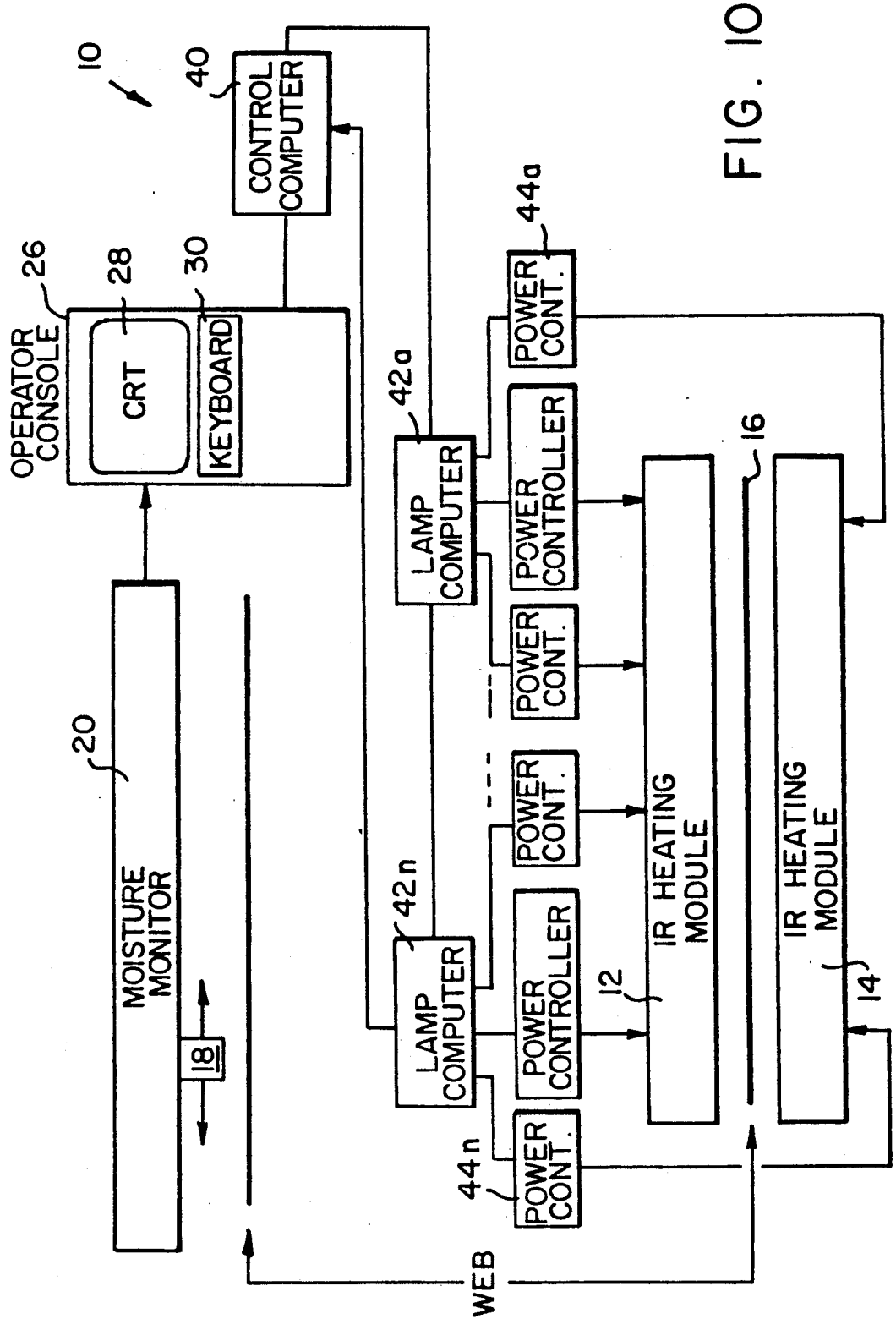
Figure 11:
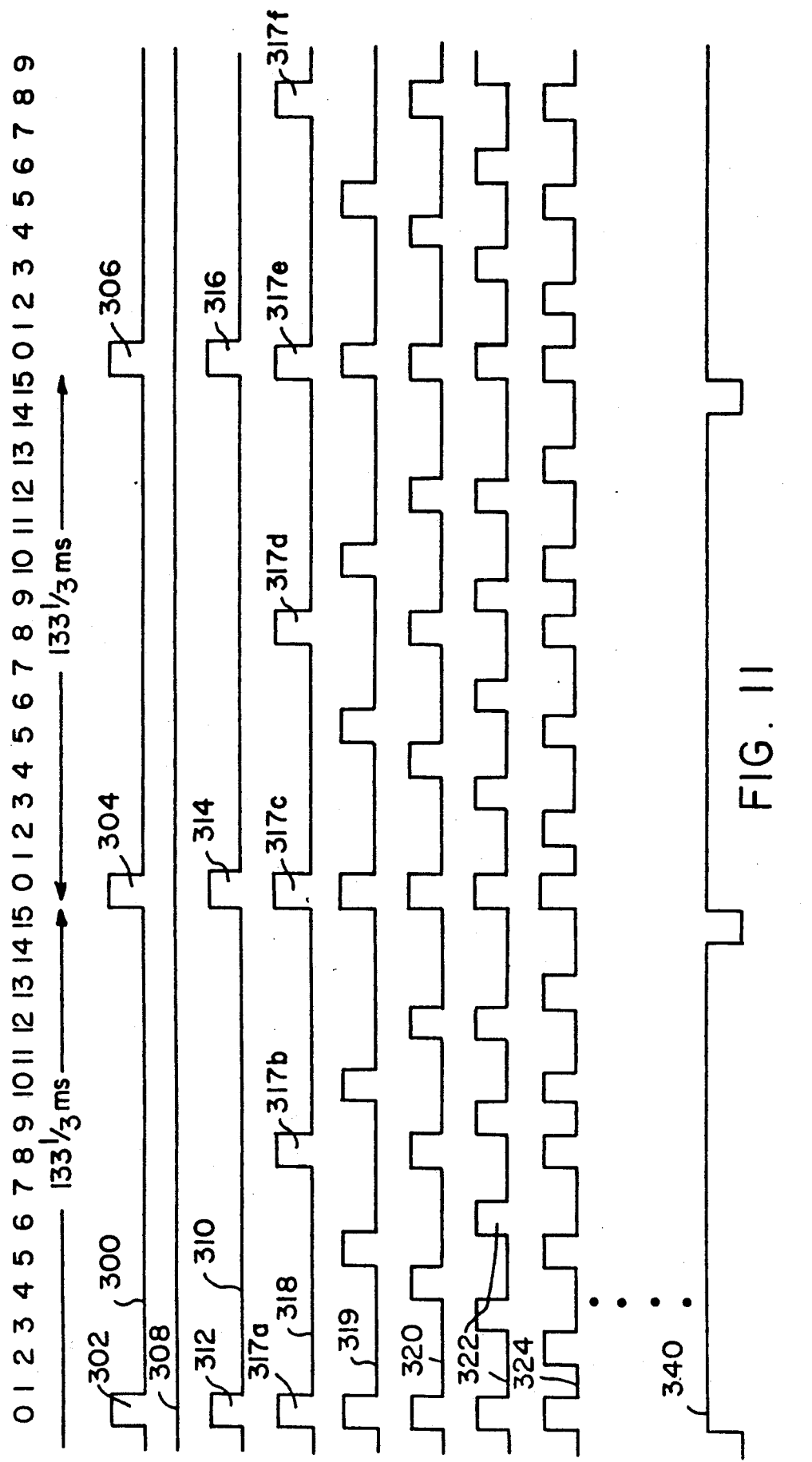
Figure 12:
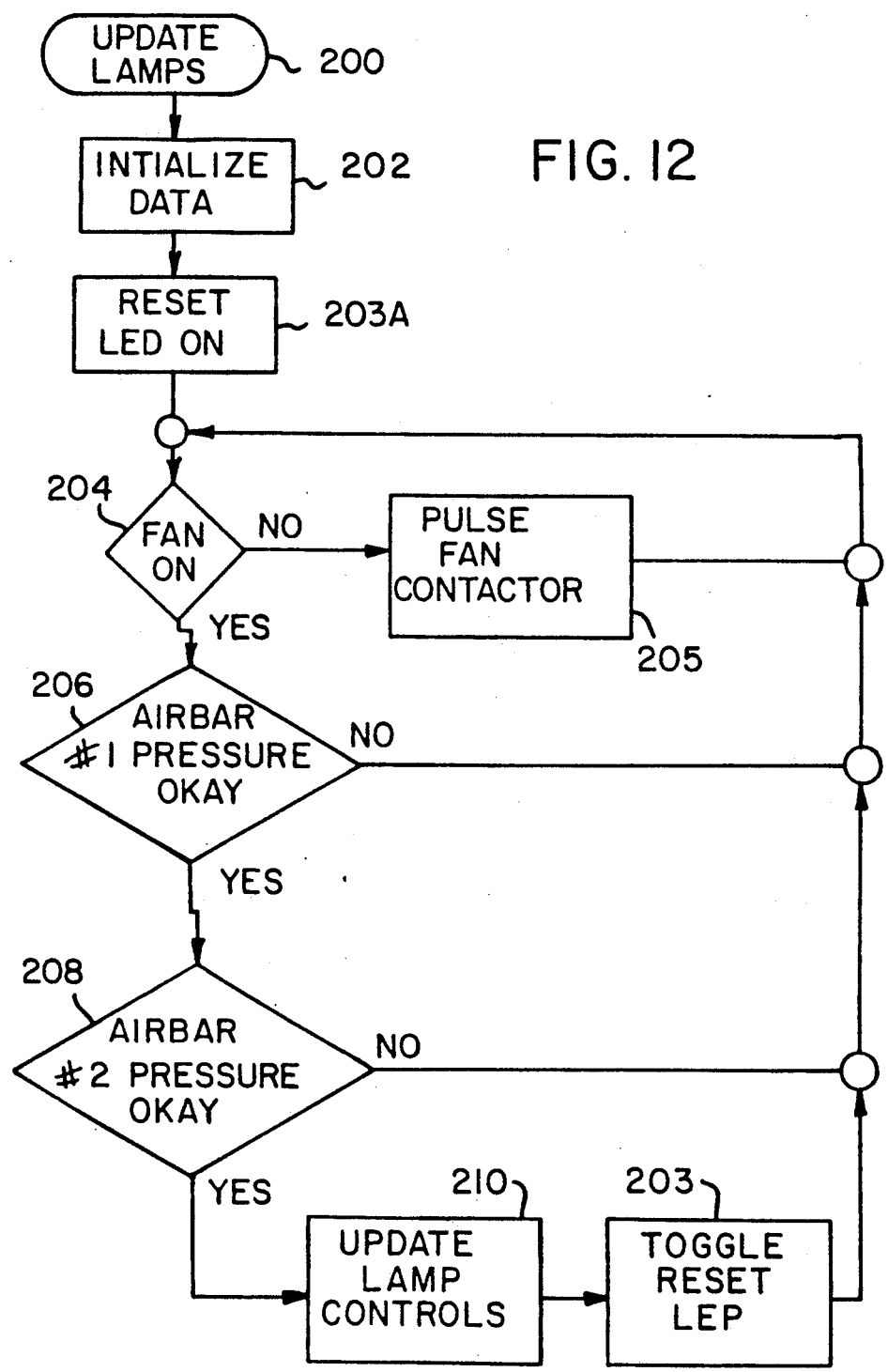
Figure 13:
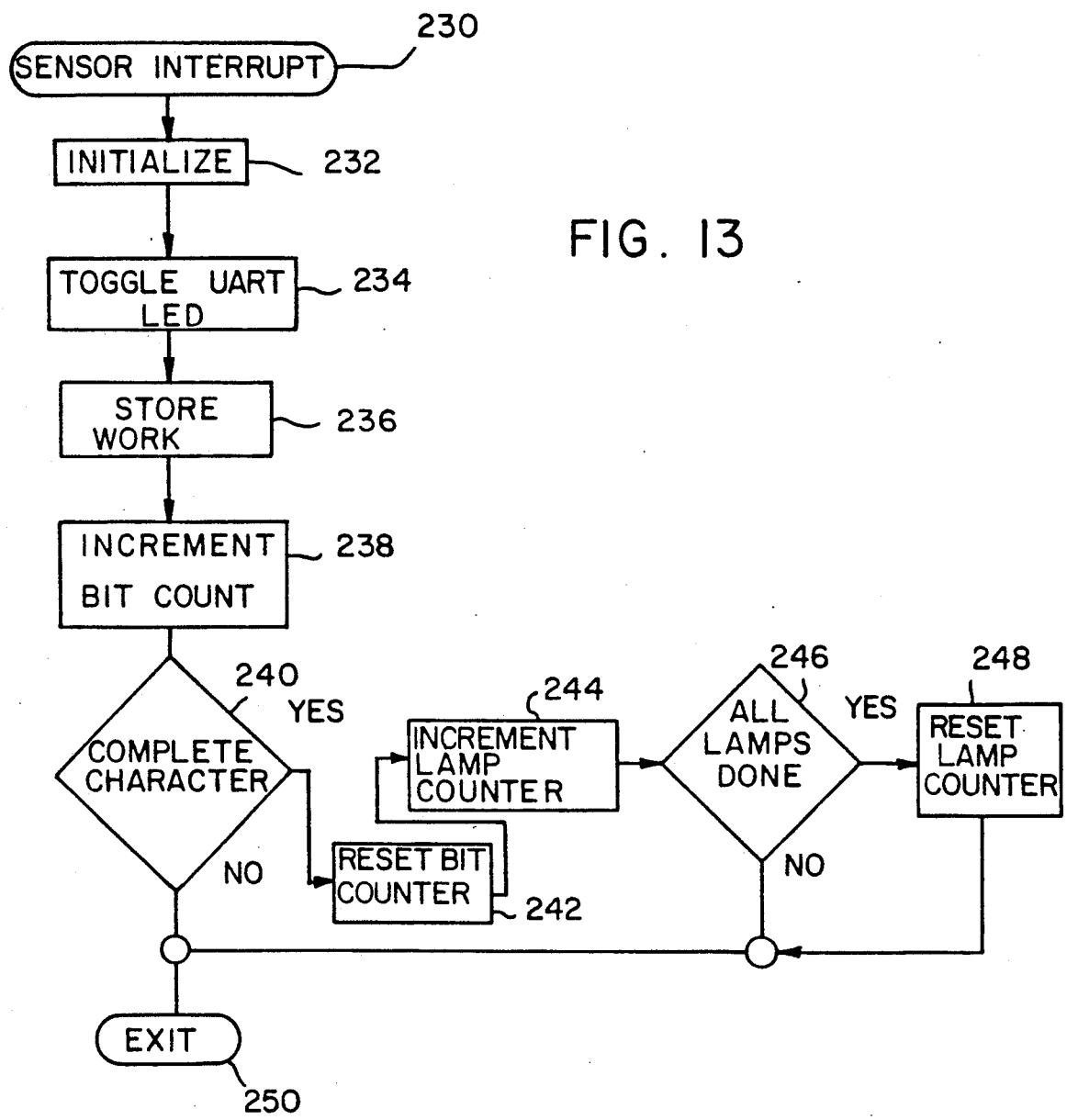
Figure 14:
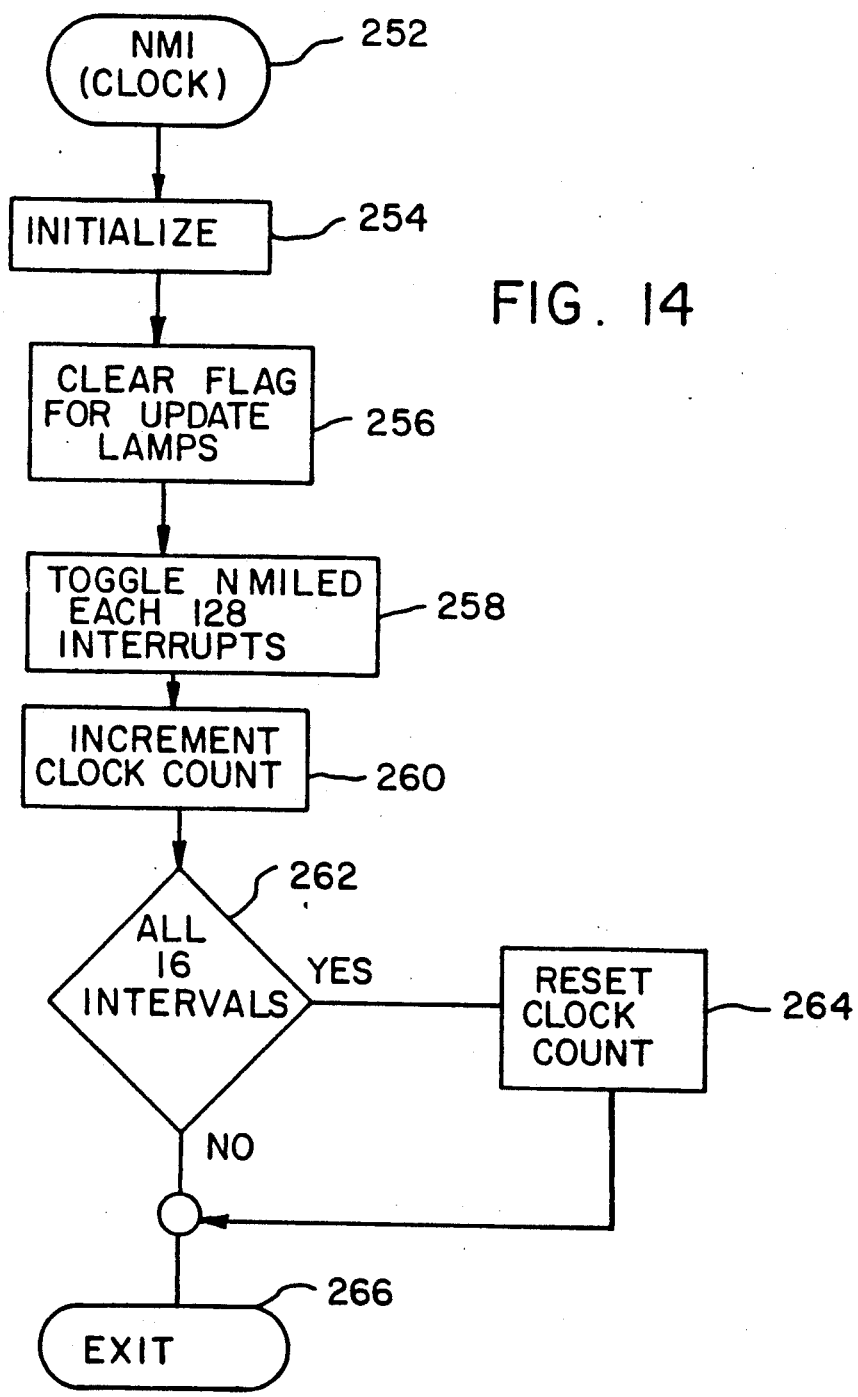
Figure 15:
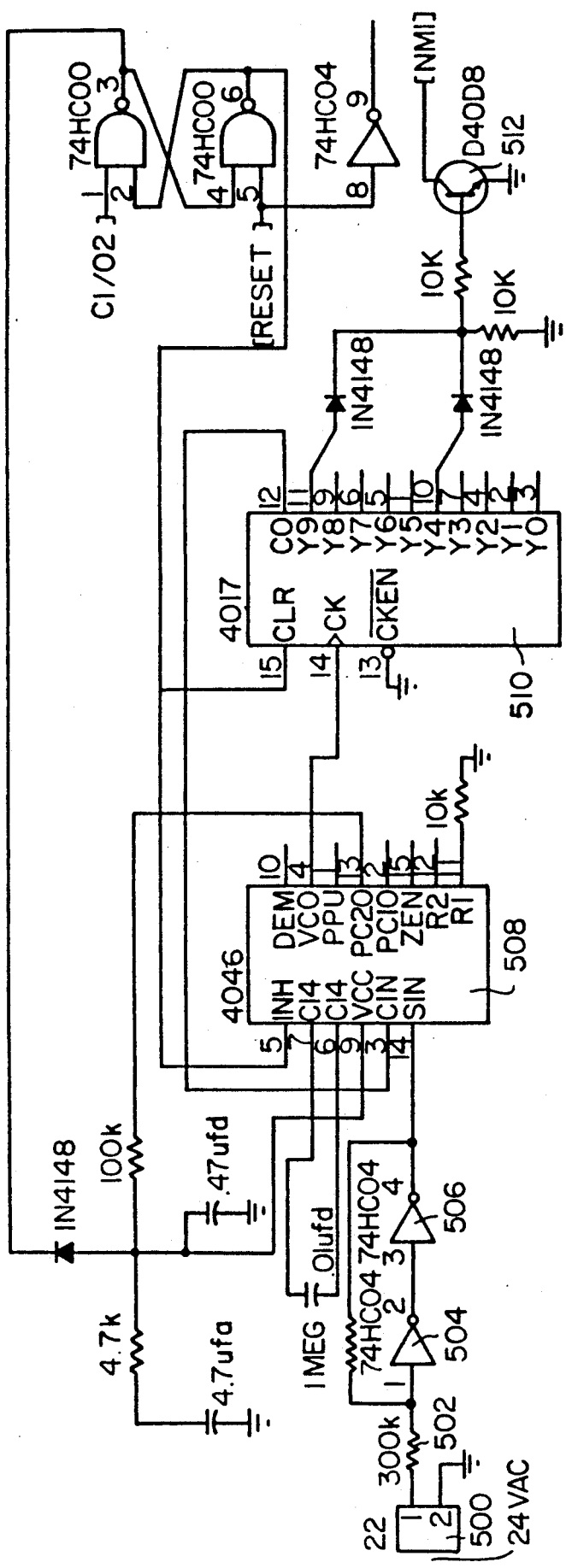

FIG. s illustrates a perspective view of the heating unit;

FIG. 9 illustrates a perspective view of a reflector;

FIG. 10 illustrates an electromechanical block diagram of the infrared drying system;

FIG. 11 illustrates a timing diagram for all poWer levels;

FIG. 12 illustrates a flow chart of the main program loop which updates the lamp controllers;

FIG. 13 illustrates a flow chart for processing moisture sensor date interrupts;

FIG. 14 illustrates a flow chart for processing of clock interrupts; and,

FIG. 15 is a circuit diagram for the phase lock loop which provides the timing input to procedure NMI.

DESCRIPTION OF THE PREFERRED EMBODIMENTS

Figure 1:
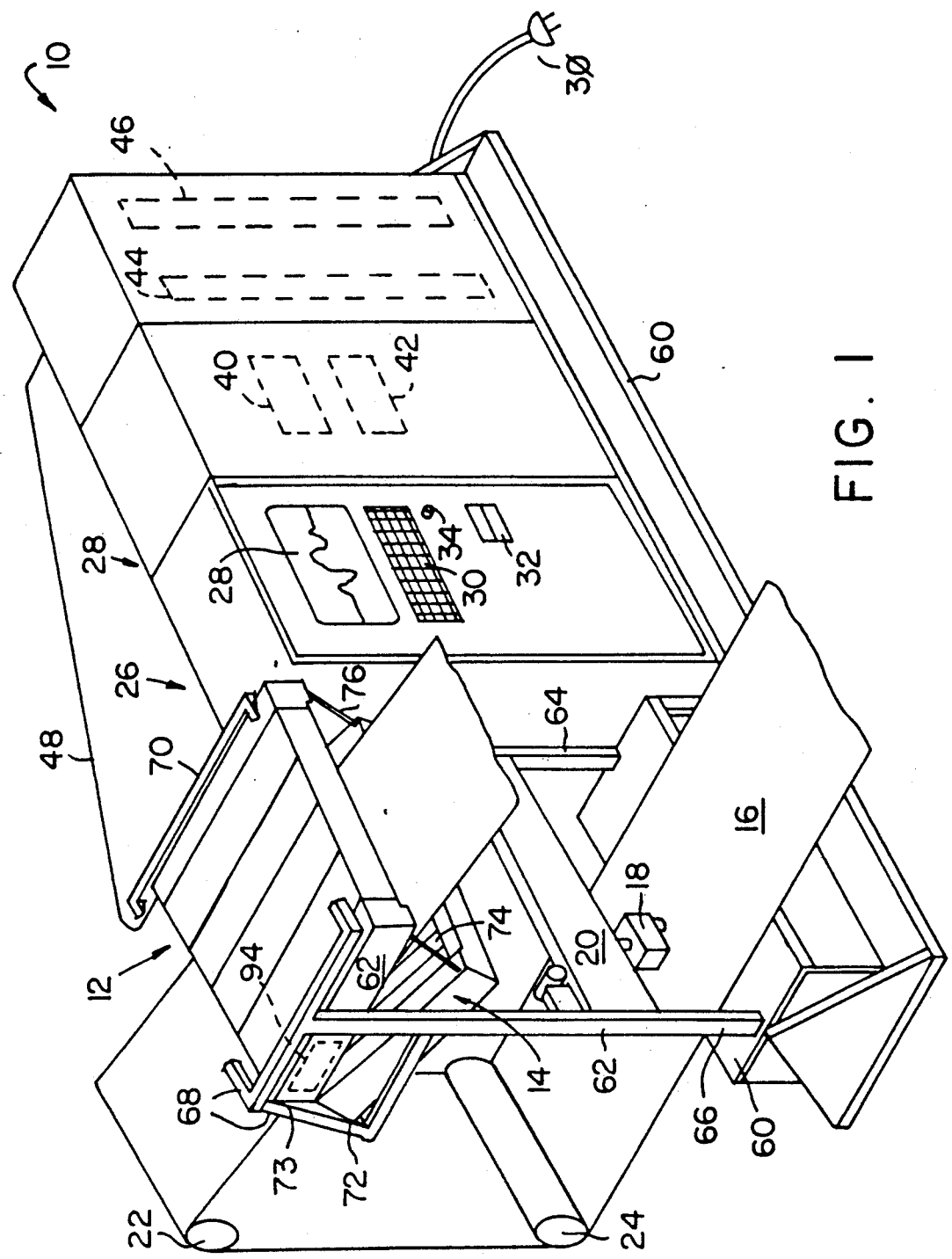
FIG. 1 illustrates a perspective view of an infrared drying system, the present invention.

FIG. 1 illustrates an infrared drying system 10 including opposing infrared drying modules 12 and 14, the subject matter of a co-pending patent application by Anderson, Ser. No. 07/404,928 filed Sept. 8, 1989, entitled "Reflector Assembly for Heating a Subordinate", and assigned to the same Assignee, and also as later described for drying a traveling web of material 16. Whereas a number of configurations are useful for practicing the present invention, one embodiment uses opposing infrared drying modules 12 and 14 in close proximity to a moisture sensor profile scanner 18 positioned in a belt and ball bearing track 20. Idler rollers 22 and 24, by example, support the traveling web of material 16 about the moisture sensor profile scanner 18 and through the opposing infrared drying modules 12 and 14. The moisture sensor profile scanner 18 connects to a moisture computer 26 for generating moisture content signals and position signals.

The moisture sensor profile scanner 18, the belt and ball bearing track 20 and the moisture computer 26 including a video monitor 28, keyboard 30 and paper printer 32 are commercially available as a system from Moisture Systems Corporation of Hopkinton, Mass. The moisture computer 26 monitors and controls the moisture sensor profile scanner 18 and the moisture profile is displayed on a high resolution color CRT and can be printed to paper. A target profile setting is settable by an operator, such as through the keyboard 30 or a potentiometer 34.

A control computer 40 connects to a lamp computer 42 and controls power controllers 44 and 46 to supply power to each lamp of the infrared drying modules 12 and 14 as later described in detail. The lamp computer 42 switches the plurality of power controllers 44 and 46 corresponding to the upper and lower infrared drying modules 12 and 14 at particular time intervals of the cycles for the three-phase power as later described in detail. Power cable 48 connects the power from the power controllers 44 and 46 to the infrared drying modules 12 and 14 as later described in detail.

A base 60 with support structure 62 including upper members 64 and 66 support the belt and ball bearing track 20. Upper support structures 68 and 70 support the opposing infrared drying modules 12 and 14 about pivot points 72 and 73. Cables 74 and 76 control the pivot movement of the lower infrared drying module 14 with respect to the upper infrared drying module 12.

Figure 2:
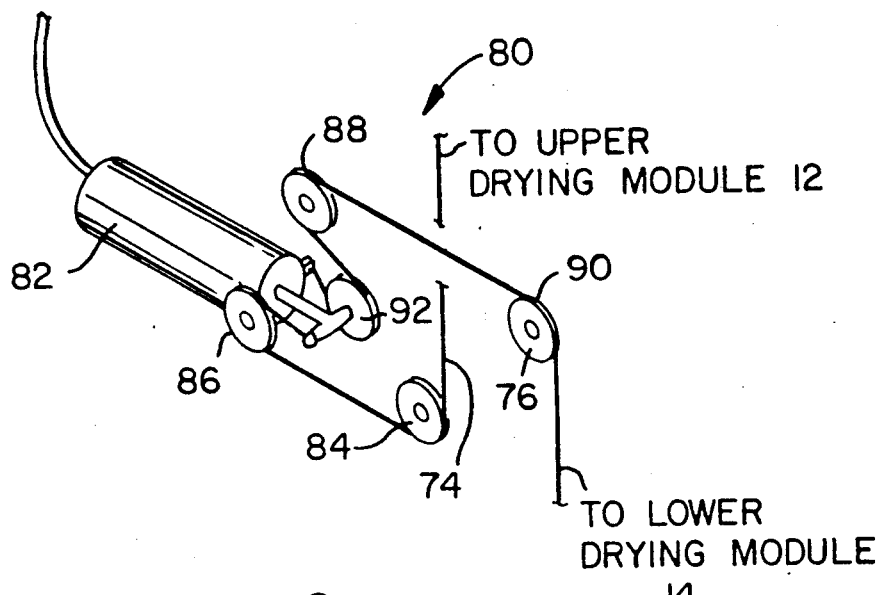
FIG. 2 illustrates a perspective view of a pneumatic assembly for raising and lowering one of the infrared modules.

FIG. 2 illustrates a perspective view of a cable assembly 80 on one side of the upper infrared drying module 12 such as for cable 74 including a pneumatic cylinder 82 and idler pulleys 84, 86, 88, 90 and 92. The structure mounts within a cavity 94 of the infrared drying module 12. A similar assembly (not shown) which cooperates with cable 176 is located within upper infrared drying module 12 on the opposite side of traveling web 16.

Turning now to FIG. 3, one embodiment of reflector 100 is illustrated where all numerals correspond to those elements previously described. The reflector 100 is preferably anodized clad aluminum in which dimples have been made to provide structural strength. The reflector 100 comprises a top substantially planar reflector portion 102 having opposed reflector side walls 104 and 106 that are increasingly angled away from each other as they extend downwardly from planar reflector portion 102. The particular angle will of course depend on the application, and specifically, the desired light dissipation pattern. Each reflector side wall 104 and 106 is bent to form channel bottoms 108 and 110. Preferably, the channel bottoms 108 and 110 are substantially U-shaped, and have rounded edges. Square edges, although functional, tend to create deleterious stress points in the reflector material. A plurality of holes 112 are formed in the reflector 100, as by drilling, so that the majority of their area occurs in the low point of said channel bottoms 108 and 110.

The reflector 100 houses lamp 114. Lamp 114 is preferably positioned inside reflector 100 near planar reflector portion 102 so as to prevent mechanical interference with the web on shut down. Lamp 114 emits light of the appropriate wavelength of infrared light, depending on the intended application. A suitable infrared lamp includes a 12" long, 2000 watt, 250 volt bulb. The lamp ends 116 and 118 of lamp 114 sit in aperture 120 of lamp holder 122 (only one shown) which is secured to the reflector casing 124 by suitable means, such as a cap screw and lockwasher (not shown). In the embodiment shown in FIG. 5, a series of three lamps 114 and reflector means 100 are housed in the reflector casing 124. The reflector casing 124 can of course be designed to house any number of lamps 114, depending on the intended application. This flexibility makes almost any size heating unit possible.

A reflector 100 and lamp retainer 126 is secured to the reflector casing 124, and specifically, to lamp holder 122, such as by fasteners connected through the illustrated holes. The reflector casing 124 is mounted in side mainframe 128 and a opposing like side mainframe (not illustrated) by securing flanges 130 and 132 of reflector casing 124 to lip 134 of the side 15 mainframe 128. Side mainframe 128 can hold a plurality of reflector casing assemblies 136 in side-by-side relation.

Figure 4:
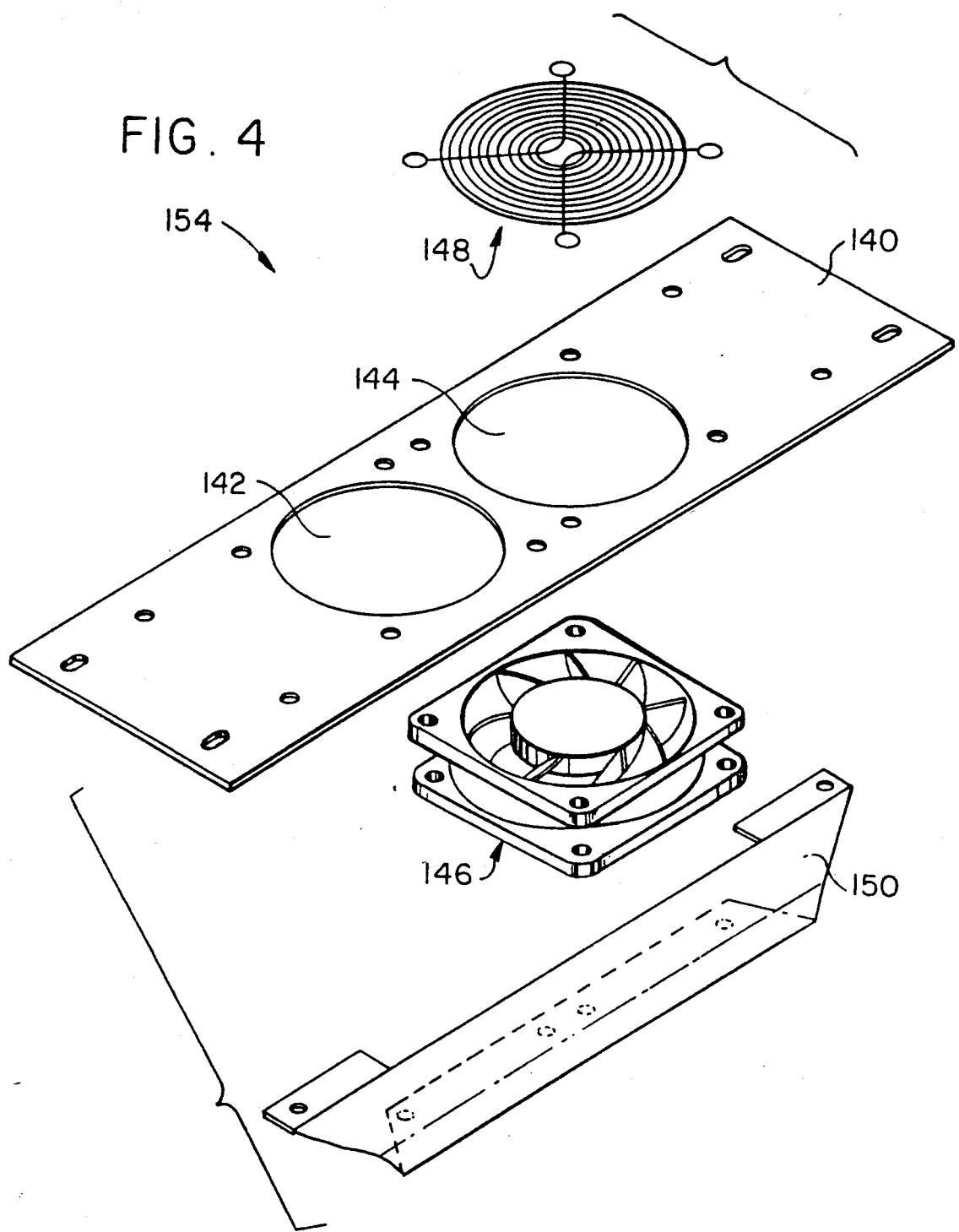
FIG. 4 illustrates a exploded perspective view of a module, of an infrared lamp and a reflector.
Figure 5:
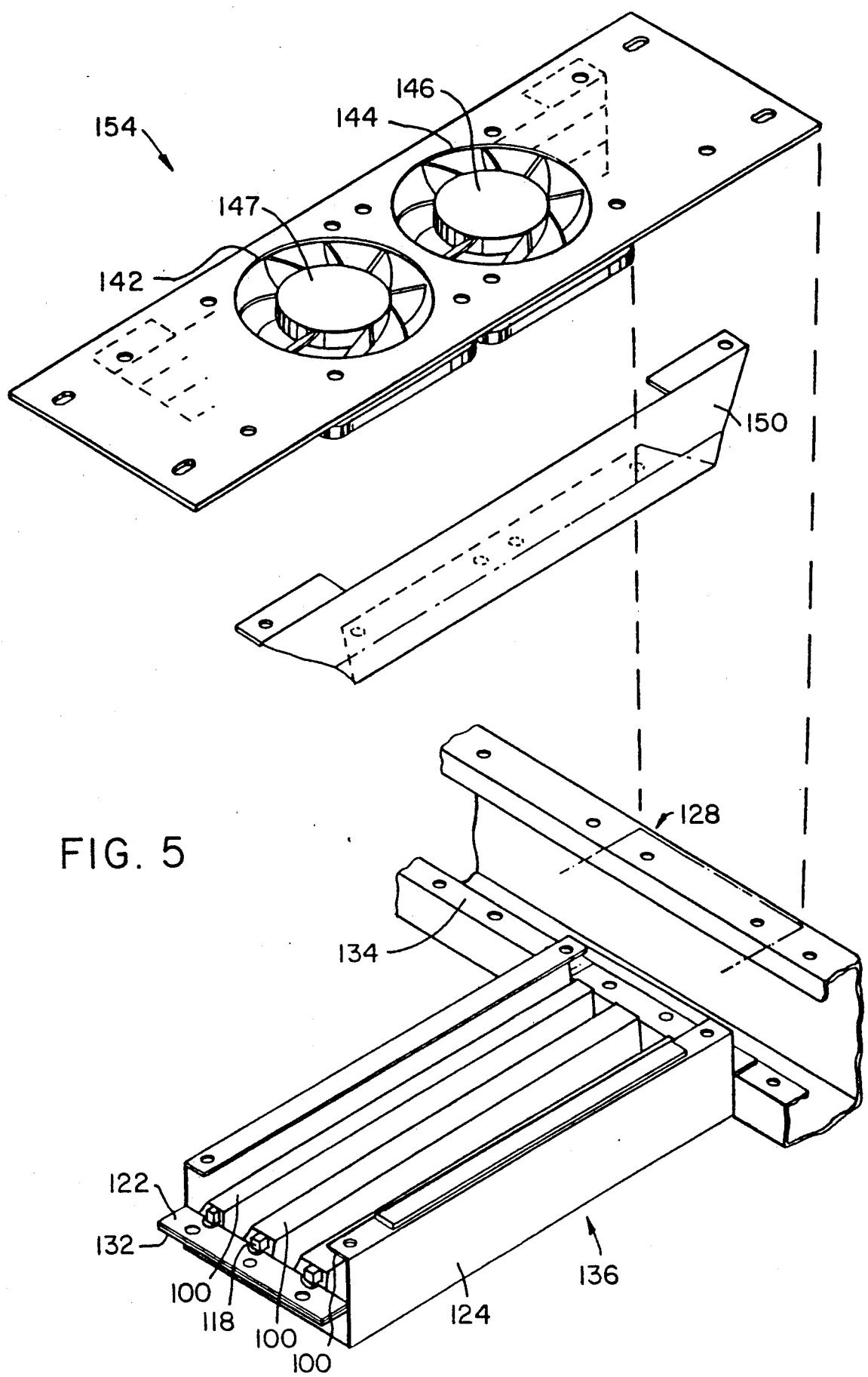
FIG. 5 illustrates a perspective view of a casing assembly and a fan assembly.

FIG. 4 illustrates an exploded view of a fan assembly 154 that is mounted on the top of reflector casing 124. During operation, the center of lamp 114 is typically the hottest. Convection currents through reflector 100 are optimized for cooling the assembly and for heating or drying the substrate where two fans are mounted near the center, in the longitudinal direction, of reflector 100, so that the largest volume of gas is moved at the hottest point. To this end fan plate 140 has two central apertures 142 and 144 in which fan 146 and another similar fan and fan guards, such as guard 148 are mounted. Fan plate brace 150 and another fan plate brace 152 of FIG. 5 are secured to fan plate 140 and fan 146 as shown. The fan assembly 154 is mounted on reflector casing 124 and on side mainframe 128 as shown in FIG. 3. A gasket 156 (see FIG. 3), such as a silicone gasket, may be placed between reflector casing 124 and the fan plate 140 to help seal the unit.

FIG. 5 illustrates a reflector casing assembly 136 and fan assembly 154 where all numerals correspond to those elements previously described. The reflector casing assembly 136 secures to the side mainframe 128. The fan assembly 154 aligns with the reflector casing assembly 136 and secures to the side mainframe 128.

Figure 6:
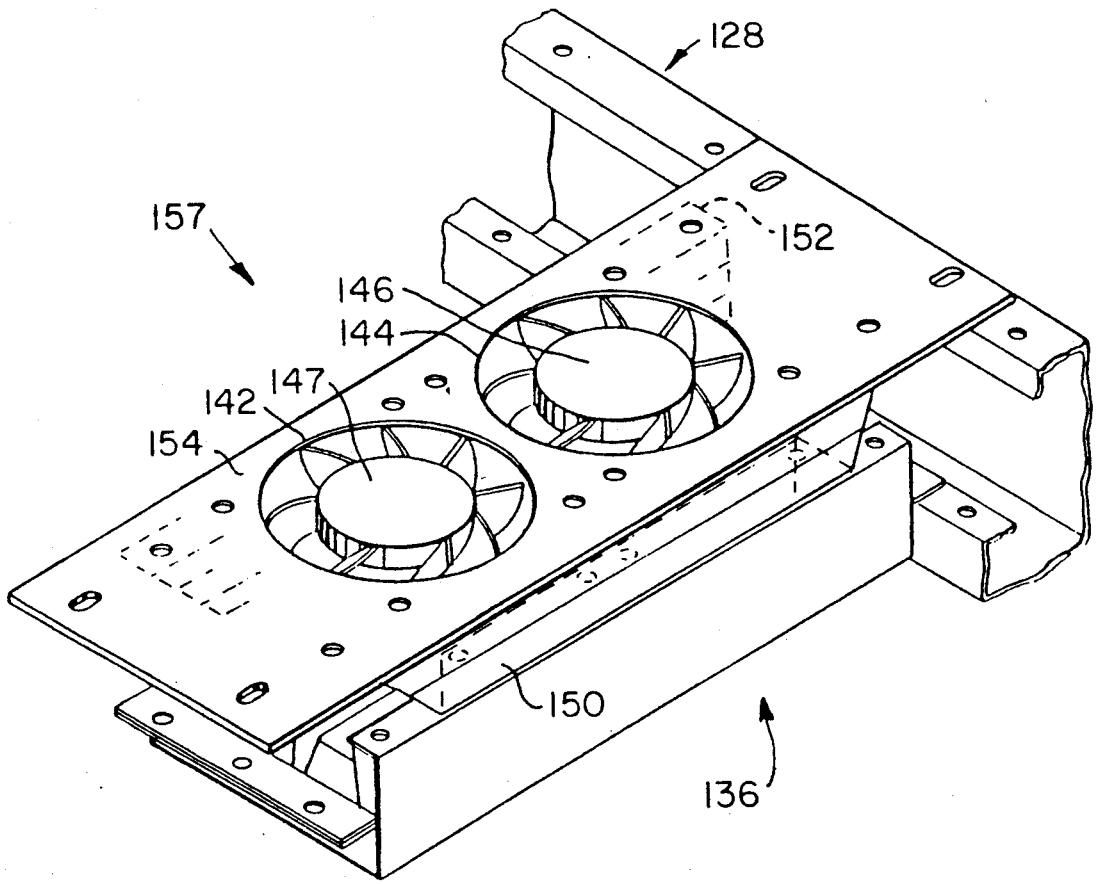
FIG. 6 illustrates a reflector casing and fan assembly aligned to a side mainframe.

FIG. 6 illustrates the assembled reflector casing assembly 136 and fan assembly 154 mated with each other and aligned to the side mainframe 128 to form an infrared heating unit 157. All other numerals correspond to those elements previously described.

FIG. 7 illustrates the infrared rays and gas flow in the assembled infrared heating unit 157 where all numerals correspond to those elements previously described.

Figure 8:
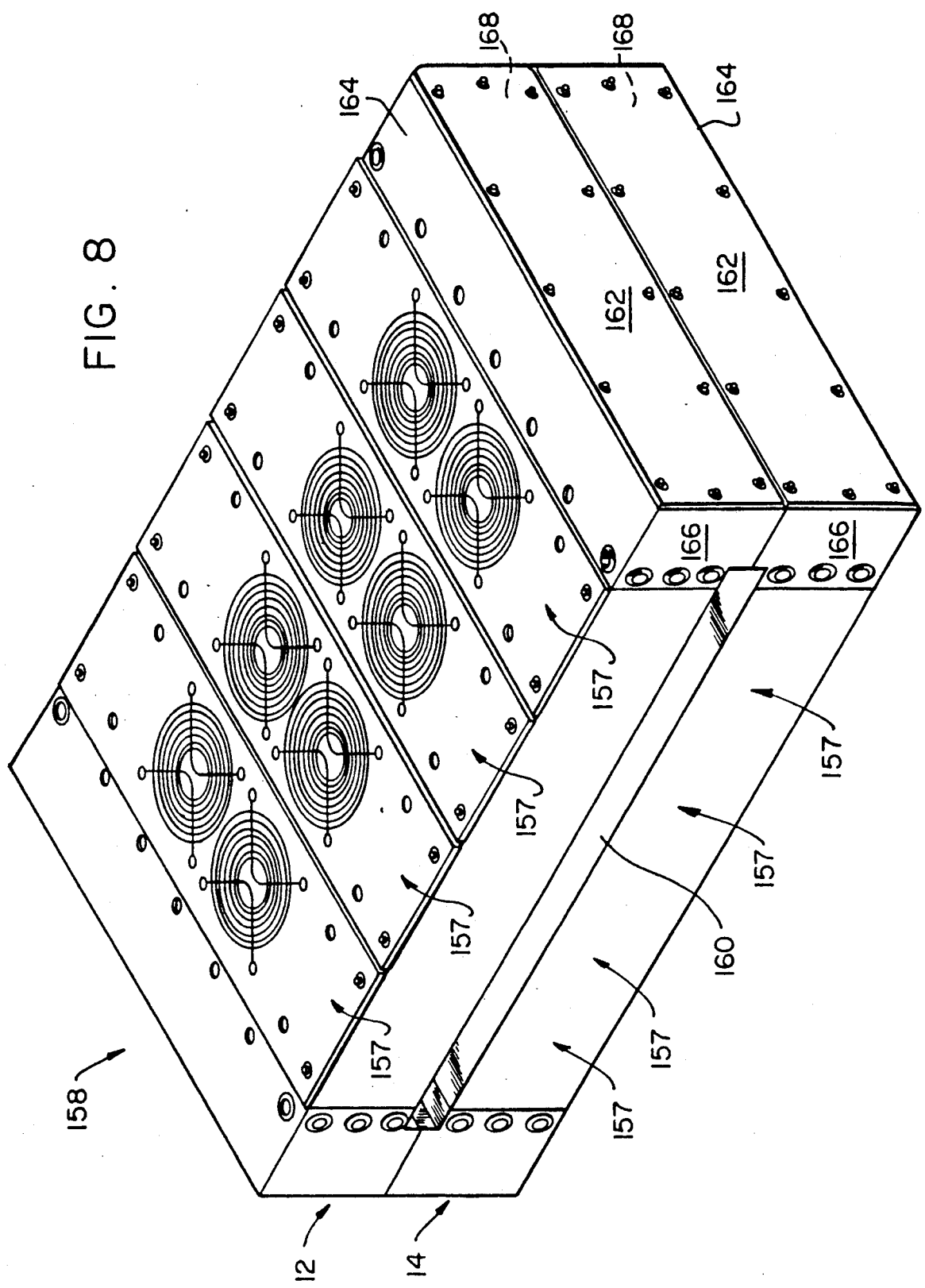

FIG. 8 illustrates a complete heating unit 158 comprised of the upper infrared drying module 12 and the lower infrared drying module 14. Each drying module is comprised of a plurality of infrared heating units 157 which form the infrared drying modules 12 and 14 which align above and below a web slot 160. Side mainframe end covers 162, 164, 166 and 168 cooperate to secure about the infrared heating units 157 to form the heating unit 158.

FIG. 9 illustrates a perspective view of an alternative reflector 100. Lamp 114 is housed in reflector 100 under planar reflector portion 102. Lamp ends 118 and 116 sit in aperture 120 in each end plate 170. Holes 112 are spaced apart from each other a distance such that there preferably are about two holes per inch of reflector.

Regardless of the particular reflector design embodiment used, the holes 112 should have sufficient diameters to allow enough gas to pass through for both cooling the reflector and heating or drying the web. The holes 112 should be substantially hidden from the lamp so as to mitigate deterioration of the reflector material. For a reflector housing a 12 inch lamp, about 2 holes per inch of reflector has been found to be effective. Also shown partially in this Figure are dimples 182 that can be formed in the surface of reflector 100, and which add strength thereto and improve the diffusion of radiation.

FIG. 10 illustrates a block diagram of the structure of FIG. 1. All numerals correspond to those elements previously described. The control computer 40 receives moisture content signals, setpoint signal, and corresponding position signals and generates power level signals and corresponding zone signals. The lamp computer 42 generates control signals for the power controllers 44 and 46 for energizing each infrared lamp over a particular time interval to provide the desired power level.

MODE OF OPERATION

The infrared drying system 10 includes the three computers, the moisture computer 26, the control computer 40, and the lamp computer 42. The first computer, the moisture computer 26 controls the moisture sensor profile scanner 18 and the moisture sensing head to provide a display. The moisture sensor profile scanner 18 generates a moisture content signal, a positioning signal is generated and a setpoint signal is operator set. The second computer, the control computer 40, generates power level signals and zone signals corresponding to those power level signals in response to the moisture signal. This computer determines, on averaging the moisture signals, whether more, less or no intensity is required by a lamp, such as an infrared lamp, over that particular zone of the traveling web of material 16. The third computer, the lamp computer 42, receives information from the control computer 40 as to each lamp or group of lamps for a particular power level. The lamp computer 42 provides that the lamp is switched on and off for the correct number of times over a given number of cycles to achieve a particular power level.

There are 16 power levels corresponding to 16 half cycles. The lamp computer 42 controls the power modules to switch power modules on and off as required to provide the desired power level. There is a separate power controller for each separate lamp in each reflector.

The signals transmitted from the control computer 40 to the lamp computer 42a–42 are digital signals in a ring communication configuration. More than one lamp computer 42 can be provided depending upon the size of the infrared drying system 10. This is especially useful for repeating the control signals for the lamp computer 42. A closed feedback loop connects from the lamp computer 42 or the last lamp computer to the control computer 40.

Each lamp computer 42 includes its own phase lock loop. The phase lock loop is powered by any one of the three-phase lines as a reference from the main power. In the alternative, the power source can also be a combination of the two different phases with respect to the neutral as long as there is the same phase difference between the power that is used to power the lamps and the same frequency. A NMI signal, non-mask interrupt, controls the lamp computer 42. A flip-flop provides a condition for initial startup. In a normal startup, the circuits are inhibited from operating and then the VCO turns on after initialization.

FIG. 11 is a basic timing diagram for the illumination of the infrared lamps. The intensity of the lamps is controlled by adjusting the duty cycle. The overall timing is synchronized to the 60 hz power line. For that reason, the basic timing period is 8⅓ milliseconds, which is the period of a half cycle of the 60 hz power cycle. The illumination cycle consists of 16 of the basic timing periods or 133⅓ milliseconds. This is produced by simply counting 16 of the basic timing periods. Line 300 shows this timing period with pulses 302, 304, and 306 spaced 133⅓ milliseconds apart and corresponding to the sixteenth zero crossing (i.e., half crossing) of phase one of the input power line. Two complete illumination cycles (i.e. 266⅔ milliseconds) are shown for clarity.

Each of the 133⅓ millisecond illumination cycles is divided into 16 equal periods of 8⅓ milliseconds, corresponding to one-half of one 60 hz power line cycle. Each of the 16 lamp intensity levels corresponds to a different number of energized 8⅓ millisecond basic periods per 133⅓ millisecond illumination cycle.

Line 308 corresponds to intensity level zero. This means that there are no energized basic periods during the illumination cycle. The result is that the corresponding infrared lamp remains off. Intensity level one is shown by line 310. It provides one basic period (i.e. 8⅓ milliseconds) of energy during each illumination cycle (i.e. 133⅓ milliseconds). Pulses 312, 314, and 316 provide the energy as shown. Similarly, line 318 has two energy pulses 317a and 317b providing a total of 16⅔ milliseconds of energy during the first 133⅓ millisecond illumination cycle. This corresponds to intensity level two. Lines 319, 320, 322, 324 . . . up to 340 show the energy pulses for intensity levels 3, 4, 5, 6 . . . up to 15, respectively. Line 340 shows energy level 15, which has 15 basic periods of energy during the 133⅓ millisecond illumination cycle meaning that the lamp is nearly on for the entire illumination cycle.

The flow charts of FIGS. 12, 13, and 14 show basic operation of the software which controls the entire system and the infrared lamps in particular (see also FIG. 10). The main loop of the software is the procedure called UPDATE LAMPS shown in FIG. 12. This procedure continues to cycle during system operation to constantly update the intensity of each lamp. The interrupt routine of FIG. 13 processes the incoming sensor data from the moisture sensor computer. The interrupt routine of FIG. 14 provides system synchronization. It processes a non-maskable interrupt which is timed from the basic 60 hz power line.

FIG. 12 is a flow chart for the main loop of the program, UPDATE LAMPS. It runs in the normal (i.e. non-interrupt mode). The program is entered at system startup at element 200. The database is initialized at element 202. This includes clearing various counters and resetting certain flags. Reset LED is also turned on.

The condition of the system fan is checked at element 204. If it is determined that the fan is not on, element 205 sends a pulse to the fan contactor to energize the fan. Notice that control is returned to element 204 to recheck the condition of the fan. The program will not proceed further until the fan is on and up to speed. To do so would risk turning on the lamps without cooling air which might damage the system. To notify the operator, element 203 turns on the reset LED. As a result, reset LED is brightly lighted if the system remains in this loop.

After it has been determined that the fans are operating properly, control proceeds to element 206 which checks whether the pressure at air bar number one (i.e. within IR heating module 14) is adequate. If the pressure is not adequate, the program remains in this tight loop and the operator is again notified because element 20 keeps reset LED brightly lighted. If element 206 determines that the pressure of air bar number one is adequate, element 208 tests for the same condition with respect to air bar number two (i.e. infrared heating module 16). Notice that any number of critical system parameters may be checked in this fashion.

When these system parameters are found to be within operating range, element 210 updates the controls for the individual lamps. Control of the infrared lamps is through varying of the duty cycle. Because the 60 hz power line provides the basic timing as explained above, the basic time period is 8⅓ milliseconds or the period of one-half of one 60 hz power cycle. As further explained above, the illumination cycle is 16 basic time periods.

The data word fetched for each lamp consists of a word wherein the bit positions correspond to one of the 16 basic timing periods within the illumination cycle.

The lamp is to be energized for the correct basic timing periods.

When all lamps have been serviced during the update function 210, control is then transferred to element 203 which toggles reset LED. Notice that in proper operation, reset LED is toggled once per basic timing period causing it to glow at half of full brilliance. This glow shows the operator that the program is functioning properly. If the reset LED is totally extinguished, the program is no longer running. If the reset LED is too bright, it indicates a system problem with the fan or air bar pressures as described above.

FIG. 13 is a flow chart for the procedure which processes the input from the moisture sensing computer. The communication is implemented with a universal asynchronous receiver/transmitter (UART) in the manner known in the art. When a complete word is received by the UART, an interrupt is generated which causes entry at element 230. The procedure is initialized at element 232 and the UART LED is toggled at element 234. Elements 236 and 238 store a word and increment bit count. Element 240 tests whether the word received is valid. If yes, element 242 stores the received word. Element 244 increments lamp counter, element 246 is for all lamps done, and element 248 is for reset lamp counter. Exit is via element 250.

FIG. 14 is a flow chart of the procedure which supplies the main timing for the system. It is started by a non-maskable interrupt caused by precise timing of the phase lock loop (PLL) circuit. Upon receipt of the interrupt, entry is via element 252. The procedure is initialized at element 254. At each pass through the NMI procedure, a computer is masked for operation from 0-15 by element 256. Depending upon the state of this counter, bits are selected and transferred to the output ports which in turn turn on or off the IR lamps. Control is next given to element 258 which toggles NMI LED after 128 interrupts. Element 260 is increment clock count, element 262 is all 16 intervals, and element 264 is reset clock count. This indicates proper operation of the timing logic to the operator as described above with regard to the other LED's. Exit is via element 266.

FIG. 15 is a schematic diagram for the circuitry which provides the basic timing for the system and which selects energization points of the infrared lamps for three-phase power. There are three complete cycles for all three phases of power. Each complete cycle has two zero crossings which basically states that there are going to be six zero crossings for the three phases and the crossings are going to be equally spaced because of the nature of the three phases. By taking the time period from zero, which is a zero crossing for any one of the three phases, the next positive zero crossing or one complete cycle is divided into six equal segments to determine the timing for each of the crossings. One does not want the computer to do anything exactly at the zero crossing. One then generates a signal which is actually 600 hz, which is ten times higher than the 60 hz signal, and these signals do not coincide with the zero crossings of the 60 hz signal. The preferred crossings are 1.1 milliseconds after the last zero crossing and 1.6 milliseconds until the next zero crossing because there is enough time provided to command the computer to complete all necessary computations before the next zero crossing occurs. This provides sufficient time to switch the power controllers. The phase lock loop circuit is utilized to provide time periods which do not coincide with the zero crossings and provide time periods which are substantially half way between the zero crossings of the 60 hz three-phase power. The preferred timing points are generated by the phase lock loop circuitry of FIG. 15, and particularly the timing points referring to number 4 position and number 9 position which provide the most effective time utilization before and after the last zero crossings. Therefore, the power controllers are switched at time period 4 and time period 9 as the time signals are farthest away from each of the zero crossings.

As can be seen, one phase of the 60 hz signal (at 24 volts) is presented via series resistor 502 to series coupled operation amplifiers 504 and 506. The signal is applied to phase lock loop (PLL) 508. The output of PLL 508 is a pulse train at 600 hz which has a fixed phase relationship to the 60 hz power line input. The output is divided by ten by counter 510. Outputs 49 and 44 of counter 510 are amplified by NPN transistor to become the NMI interrupt (see FIG. 14 for the software which handles this interrupt).

Appendix sets forth a specific example of an infrared drying system 10 with two opposing lamps with 16 power levels and is expandable to 128 lamps. The appendix includes a general description, a control box description, a program description, a software listing and three flow charts for reset, interrupt, and nonmaskable interrupt.

Various modifications can be made to the present invention without departing from the apparent scope hereof.

APPENDIX 1

IR DESCRIPTION

The following files are used for documentation of this project:

```
D:\SCHEMA\GBP-CONT.PO1, BO1, CFG
D:\SCHEMA\GBP-PLL.PO1, PO2, BO1, BO2, CFG
D:\SCHEMA\GBP-POW.PO1, BO1, CFG
D:\SCHEMA\GBP-ALL.PO1, PO2, PO3, PO4, PO5, BO1, BO2,
BO3, BO4, BO5, CFG
D:\SCHEMA\GBP-COM.PO1, BO1, CFG
D:\EASYFLOW\GBP-IRQ.EFS, BAK
D:\EASYFLOW\GBP-NMI.EFS, BAK
D:\EASYFLOW\GBP-RES.EFS, BAK
D:\6502\GBP\ALL.GBP, BAK
D:\6502\GBP\CONT-GBP.BAS
D:\6502\GBP\CONT.GBP
D:\6502\GBP\CTRL-GBP.GBP, HEX
D:\6502\GBP\EPROM.HEX
D:\6502\GBP\GBNMI.BAK
D:\6502\GBP\GBUF.BAK
D:\6502\GBP\IRQ.GBP, BAK
D:\6502\GBP\MEMORY.GBP, BAK
D:\6502\GBP\NMI.GBP, BAK
D:\6502\GBP\RESET.GBP, BAK
D:\6502\GBP\TABLE.GBP, BAK
```

GENERAL

The purpose of this electrical system is to control the power to two IR air bars mounted to a single press and used in a testing mode. The electrical system will power either 380 volt (short wave) or 480 volt (medium wave) lamps.

The system is powered by 480 volt, 3 phase, 60 hertz, delta connected power. Since only two lamps are used, an unequal phase load will be present. Lamp #1 is connected to phase A and B, Lamp #2 is connected to phase B and C. A 7.5 horsepower fan motor is also powered by this system. Operating at full power or 7 kilowatt per lamp, phase A will draw 25 ampere, phase B will draw 35 ampere and phase C will draw 25 ampere.

Two 2 kva universal control transformers are used in the "buck" mode to reduce the 480 volt level to 380 volts when 380 volt operation is desired. Voltage mode selection is made by connecting one lamp lead to either the T1 terminal on the lamp contactor for 380 volt operation or to the T2 terminal on the lamp contactor for 480 volt operation. The other lead of the lamp is connected to terminal #2 of the appropriate solid state relay.

Solid state relays are used in the lamp lenses to allow operation of each lamp at any one of 16 power levels as set by the control box. A 6502 based micro-computer is used to read the signal from the control box, check for press operation, check for pressure switch operation and in turn, control the fan operation and generate timing signals for lamp operation.

CONTROL BOX:

The control box is powered by 110 volts AC and generates appropriate signals that are sent to the micro-computer over a balanced RS-422 type line. The communications parameters are 1200 baud, 8 data bits, 2 stop bits and even parity. The desired code is repeated every 1.7 seconds. The code consists of three characters, "Axy" where "x" is the power level code for lamp #1 and "y" is the power level code for lamp #2. The code sent may also be "R" when the toggle switch on the control box is off. This will cause the micro-computer to set all lamps to the "zero" power level.

Code generation for the control box is done by using an EPROM that is programmed to contain all the necessary codes. These codes are derived using a "Basic" program. The control box has the capability of sending a string of eight characters. Although this application needs a string of one or three in length, it is desired to send a carriage return and line feed after each string. This would require a string of five characters. Since eight is the next logical string length, eight is what is available.

The control box has the capability of sending no code at a given time by simply making the high high order bit "1". As a result, the following codes are programmed and sent by the control box;
Time #0—no character sent ⟨n/c⟩
Time #1—⟨n/c⟩
Time #2—⟨n/c⟩
Time #3—"A" or ⟨n/c⟩ if the toggle switch is off
Time #4—power code for lamp #1 or ⟨n/c⟩ if the toggle switch is off
Time #5—power code for lamp #2 or "R" if the toggle switch is off
Time #6—carriage return
Time #7—line feed The power codes for the sixteen power levels are the characters "0" to "9" for the first ten levels plus the characters ":", ";", "<", "=", ">" and "?" in the order as listed.

MICRO-COMPUTER

In addition to the control box serial input to the micro-computer, there are three additional control inputs. The first is a 110 volt signal confirming that the press is running at or above 10% of it's rated speed. The remaining two inputs are also 110 volt levels connected to two pressure switches, one on each air bar. These inputs confirm that the supply air is indeed getting to the air bars. The 10% speed input is required to turn on the fan motor starter. All three inputs are required to turn on the lamp contactors and start the power level increase to the levels sent by the control box.

There is one final input signal that is required for operation. This is a synchronization signal supplied by a small 24 volt transformer. This signal is fed to a phase lock loop circuit that generates a non-maskable interrupt at a precise time that does NOT correspond to the zero crossing of any of the three phases of the supply power. The actual time of the signal is 1.11 millisecond after a zero crossing and 1.67 millisecond before the next crossing. These interrupts occur at a rate of 120 per second (assuming 60 hertz line frequency).

There are a total of eight outputs provided with the system. Three of these outputs simply drive individual LED's for indication of operation. The "Reset" output or LED is on during initialization and then toggles each time the main loop of the micro-computer program is started. Since the main program loop runs extremely fast, the LED does not appear to toggle. It only arrears slightly dim with respect to the other LED's. The "IRQ" output or LED toggles each time a valid control character is received from the control box. The "NMI" output or LED toggles after each 128 interrupts or each 128/120 or 1.07 seconds.

Three of the remaining outputs drive three solid state relays that in turn drive the two lamp contactors and the fan motor starter. The remaining two outputs drive two solid state relays that control the intensity of each lamp.

The 690 byte program along with the 512 byte look-up tables are contained in a single 4 kilobyte (4096 byte) EPROM. A total of 901 bytes of RAM are required for temporary storage. Although 1 kilobyte would be sufficient, 3 kilobytes are provided.

The micro-computer, although being used to control two lamps, has all the memory and program requirements to control 128 lamps. The program will run as it is now, with no additional time delays, when controlling up to 128 lamps.

PROGRAM

At power on time, the micro-computer program initializes a few pointers, turns off all outputs and zeros all setpoints. The program then checks to see if the press speed input is on and if the pressure switches are on. If they are on, the program continues. If the inputs are not on, a check is made to see if the press speed input is on. If it is on, the fan motor starter is turned on and the lamp contactors are turned off. If the press speed is not on, the fan starter and the lamp contactors are turned off and the program restarts from very close to the beginning of the initialization procedure.

When the program continues, as explained before, the setpoint for the current lamp is compared to the output level. If the setpoint is the same as the output, the current lamp is advanced and that lamp is checked in the same way. If the setpoint is less than the output, the output is made the same as the setpoint. The program then updates the "bit maps" used to control the lamp intensity. If the setpoint is larger than the output, a check is made to see if one second has elapsed since the output level of this lamp has been increased. If one second has elapsed, the output level is increased by one and the "bit maps" are updated. After the "bit maps" are updated, the current lamp is advanced and that lamp is checked in the same way. If the setpoint is larger than the output and one second has NOT elapsed since the output was increased, the current lamp is advanced and that lamp is checked in the same way.

The program checks all 128 possible lamps in about two milliseconds. This includes the time required for the two interrupt routines to take place.

The IRQ or interrupt request is executed when a character is received by the UART (Universal Asynchronous Receiver Transmitter). A check is made to be sure the character was received correctly. If an error is detected, the micro-computer is forced into a re-initialization. The character is then examined to determine what action to take. If the character is "A" through "P" the lamp number is set accordingly. "A" will set the lamp number for 0, "B" will set the lamp number for 8, and so forth up to "P" setting the lamp number up to 120.

If the character received is "0" through "?" as explained before with the control box, the lamp number setpoint is made the corresponding power level, 0 to 15. The lamp number is then incriminated by one. If a "+" character is received, the lamp number is incriminated by one. If the character received is a "—" the lamp number decrements by one. If a "R" is received, all lamp setpoints are set to zero.

After the appropriate action is taken depending on the character received, IRQ routine is exited and the main program loop continues.

The NMI or non-maskable interrupt occurs 120 times a second. During each interrupt, the lamp phase counter is incriminated and the 16 defined, 8 bit output ports are set for the current output levels and lamp phase as determined by the output bit maps. This normally completes the interrupt routine except when the lamp phase counter reaches 128. When this happens, all 128 lamp increment flags are set. These flags are used to determine the elapsed time between increments of the output levels for each lamp. This completes the interrupt routine and the main program loop continues.

```
ALL.LST                         Monday, July 17, 1989 8:58 am 0078  00000000         DFB     0, 0, 0, 0           ;LAMP 120
007C  00000000         DFB     0, 0, 0, 0           ;LAMP 124

;*********** LAMP BIT MASK **************

0080                   ORG     BASE + 00080H 0080  01020408         DFB     1H,  2H,  4H,  8H    ;LAMP 0
0084  10204080         DFB     10H, 20H, 40H, 80H   ;LAMP 4
0088  00000000         DFB     0H,  0H,  0H,  0H    ;LAMP 8
008C  00000000         DFB     0H,  0H,  0H,  0H    ;LAMP 12
0090  00000000         DFB     0H,  0H,  0H,  0H    ;LAMP 16
0094  00000000         DFB     0H,  0H,  0H,  0H    ;LAMP 20
0098  00000000         DFB     0H,  0H,  0H,  0H    ;LAMP 24
009C  00000000         DFB     0H,  0H,  0H,  0H    ;LAMP 28
00A0  00000000         DFB     0H,  0H,  0H,  0H    ;LAMP 32
00A4  00000000         DFB     0H,  0H,  0H,  0H    ;LAMP 36
00A8  00000000         DFB     0H,  0H,  0H,  0H    ;LAMP 40
00AC  00000000         DFB     0H,  0H,  0H,  0H    ;LAMP 44
00B0  00000000         DFB     0H,  0H,  0H,  0H    ;LAMP 48
00B4  00000000         DFB     0H,  0H,  0H,  0H    ;LAMP 52
00B8  00000000         DFB     0H,  0H,  0H,  0H    ;LAMP 56
00BC  00000000         DFB     0H,  0H,  0H,  0H    ;LAMP 60
00C0  00000000         DFB     0H,  0H,  0H,  0H    ;LAMP 64
00C4  00000000         DFB     0H,  0H,  0H,  0H    ;LAMP 68
00C8  00000000         DFB     0H,  0H,  0H,  0H    ;LAMP 72
00CC  00000000         DFB     0H,  0H,  0H,  0H    ;LAMP 76
00D0  00000000         DFB     0H,  0H,  0H,  0H    ;LAMP 80
00D4  00000000         DFB     0H,  0H,  0H,  0H    ;LAMP 84
00D8  00000000         DFB     0H,  0H,  0H,  0H    ;LAMP 88
```

```
00DC 00000000         DFB      OH, OH, OH, OH        ;LAMP 92
00E0 00000000         DFB      OH, OH, OH, OH        ;LAMP 96
00E4 00000000         DFB      OH, OH, OH, OH        ;LAMP 100
00E8 00000000         DFB      OH, OH, OH, OH        ;LAMP 104
00EC 00000000         DFB      OH, OH, OH, OH        ;LAMP 108
00F0 00000000         DFB      OH, OH, OH, OH        ;LAMP 112
00F4 00000000         DFB      OH, OH, OH, OH        ;LAMP 116
00F8 00000000         DFB      OH, OH, OH, OH        ;LAMP 120
00FC 00000000         DFB      OH, OH, OH, OH        ;LAMP 124

;*************************************************
         ;****** POWER LEVEL TABLE ************************
         ;*************************************************

00FF =        X:       EQU      0FFH
0000 =        O:       EQU      000H
0100                   ORG      BASE + 00100H 0100 00000000         DFB      O, O, O, O        ;LEVEL 0
0104 00000000         DFB      O, O, O, O
0108 00000000         DFB      O, O, O, O
010C 00000000         DFB      O, O, O, O 0110 00000000         DFB      O, O, O, O        ;LEVEL 1
0114 00000000         DFB      O, O, O, O
0118 00000000         DFB      O, O, O, O
011C 000000FF         DFB      O, O, O, X 0120 00000000         DFB      O, O, O, O        ;LEVEL 2
0124 000000FF         DFB      O, O, O, X
0128 00000000         DFB      O, O, O, O
012C 000000FF         DFB      O, O, O, X 0130 00000000         DFB      O, O, O, O        ;LEVEL 3
0134 00FF0000         DFB      O, X, O, O
0138 0000FF00         DFB      O, O, X, O
013C 000000FF         DFB      O, O, O, X 0140 000000FF         DFB      O, O, O, X        ;LEVEL 4
0144 000000FF         DFB      O, O, O, X
0148 000000FF         DFB      O, O, O, X
014C 000000FF         DFB      O, O, O, X 0150 000000FF         DFB      O, O, O, X        ;LEVEL 5
0154 0000FF00         DFB      O, O, X, O
0158 00FF0000         DFB      O, X, O, O
015C FF0000FF         DFB      X, O, O, X 0160 0000FF00         DFB      O, O, X, O        ;LEVEL 6
0164 FF0000FF         DFB      X, O, O, X
0168 0000FF00         DFB      O, O, X, O
016C FF0000FF         DFB      X, O, O, X 0170 0000FF00         DFB      O, O, X, O        ;LEVEL 7
```

```
0174 FF00FF00        DFB     X, O, X, O
0178 00FF00FF        DFB     O, X, O, X
017C 00FF00FF        DFB     O, X, O, X 0180 00FF00FF        DFB     O, X, O, X        ;LEVEL 8
0184 00FF00FF        DFB     O, X, O, X
0188 00FF00FF        DFB     O, X, O, X
018C 00FF00FF        DFB     O, X, O, X

0190 FFFF00FF        DFB     X, X, O, X        ;LEVEL 9
0194 00FF00FF        DFB     O, X, O, X
0198 FF00FF00        DFB     X, O, X, O
019C FF00FF00        DFB     X, O, X, O

01A0 FFFF00FF        DFB     X, X, O, X        ;LEVEL A
01A4 00FFFF00        DFB     O, X, X, O
01A8 FFFF00FF        DFB     X, X, O, X
01AC 00FFFF00        DFB     O, X, X, O

01B0 FFFFFF00        DFB     X, X, X, O        ;LEVEL B
01B4 FFFF00FF        DFB     X, X, O, X
01B8 FF00FFFF        DFB     X, O, X, X
01BC 00FFFF00        DFB     O, X, X, O

01C0 FFFFFF00        DFB     X, X, X, O        ;LEVEL C
01C4 FFFFFF00        DFB     X, X, X, O
01C8 FFFFFF00        DFB     X, X, X, O
01CC FFFFFF00        DFB     X, X, X, O

01D0 FFFFFFFF        DFB     X, X, X, X        ;LEVEL D
01D4 FF00FFFF        DFB     X, O, X, X
01D8 FFFF00FF        DFB     X, X, O, X
01DC FFFFFF00        DFB     X, X, X, O

01E0 FFFFFFFF        DFB     X, X, X, X        ;LEVEL E
01E4 FFFFFF00        DFB     X, X, X, O
01E8 FFFFFFFF        DFB     X, X, X, X
01EC FFFFFF00        DFB     X, X, X, O

01F0 FFFFFFFF        DFB     X, X, X, X        ;LEVEL F
01F4 FFFFFFFF        DFB     X, X, X, X
01F8 FFFFFFFF        DFB     X, X, X, X
01FC FFFFFFFF        DFB     X, X, X, X

0200                 INCL    "RESET.GBP"
;************************************************
;******************* RESET **********************
;************************************************
```

;RESET AND MAIN PROGRAM LOOP FOR GREATER BUFFALO PRESS

```
0200                    ORG     BASE + 00200H

;THE FIRST THING TO DO IS TO SET UP THE STACK POINTER

0200 A2FF      START:   LDX     #0FFH
0202 9A                 TXS             ;SET STACK POINTER
0203 78                 SEI             ;JUST IN CASE
           ;TO PREVENT NMI FROM SCREWING THINGS UP BEFORE WE'RE

;BASE:   EQU     0F000H  ;USE FOR ACTUAL ADDRESSES
0000 =          BASE:   EQU     00000H  ;USE FOR EPROM CODE

F400 =          IRQVEC: EQU     0F400H
F600 =          NMIVEC: EQU     0F600H
F200 =          RESVEC: EQU     0F200H

0000                    INCL    "TABLE.GBP"
;****************************************************
;***************** TABLE ****************************
;****************************************************

0000                    CPU     "6502.TBL"
0000                    HOF     "INT8"

0000                    ORG     BASE + 00000H

;***** PORT NUMBER TABLE **************
; ALL USED PORTS HAPPEN TO BE ZERO 0000 00000000           DFB     0, 0, 0, 0       ;LAMP 0
0004 00000000           DFB     0, 0, 0, 0       ;LAMP 4
0008 00000000           DFB     0, 0, 0, 0       ;LAMP 8
000C 00000000           DFB     0, 0, 0, 0       ;LAMP 12
0010 00000000           DFB     0, 0, 0, 0       ;LAMP 16
0014 00000000           DFB     0, 0, 0, 0       ;LAMP 20
0018 00000000           DFB     0, 0, 0, 0       ;LAMP 24
001C 00000000           DFB     0, 0, 0, 0       ;LAMP 28
0020 00000000           DFB     0, 0, 0, 0       ;LAMP 32
0024 00000000           DFB     0, 0, 0, 0       ;LAMP 36
0028 00000000           DFB     0, 0, 0, 0       ;LAMP 40
002C 00000000           DFB     0, 0, 0, 0       ;LAMP 44
0030 00000000           DFB     0, 0, 0, 0       ;LAMP 48
0034 00000000           DFB     0, 0, 0, 0       ;LAMP 52
0038 00000000           DFB     0, 0, 0, 0       ;LAMP 56
003C 00000000           DFB     0, 0, 0, 0       ;LAMP 60
0040 00000000           DFB     0, 0, 0, 0       ;LAMP 64
0044 00000000           DFB     0, 0, 0, 0       ;LAMP 68
0048 00000000           DFB     0, 0, 0, 0       ;LAMP 72
004C 00000000           DFB     0, 0, 0, 0       ;LAMP 76
0050 00000000           DFB     0, 0, 0, 0       ;LAMP 80
```

```
0054 00000000              DFB      0, 0, 0, 0       ;LAMP 84
0058 00000000              DFB      0, 0, 0, 0       ;LAMP 88
005C 00000000              DFB      0, 0, 0, 0       ;LAMP 92
0060 00000000              DFB      0, 0, 0, 0       ;LAMP 96
0064 00000000              DFB      0, 0, 0, 0       ;LAMP 100
0068 00000000              DFB      0, 0, 0, 0       ;LAMP 104
006C 00000000              DFB      0, 0, 0, 0       ;LAMP 108
0070 00000000              DFB      0, 0, 0, 0       ;LAMP 112
0074 00000000              DFB      0, 0, 0, 0       ;LAMP 116

;READY. THE NMI ROUTINE WILL CHECK THREE MEMORY
                 ;LOCATIONS FOR THE CORRECT PATTERN.IF WRONG,
                 ; INTERRUPT ROUTINE IS OVER
0204 A9FF              LDA      #0FFH    ;NMI CHECKOUT BYPASS
0206 8D8003            STA      0380H    ;BYTE MUST BE 00
0209 8D8103            STA      0381H    ;BYTE MUST BE 55
020C 8D8203            STA      0382H    ;BYTE MUST BE AA
                 ;ALL ACTUAL OUTPUT PORTS ARE SET TO ZERO SO LAMPS ARE OFF
020F A900              LDA      #00H     ;ZERO OUTPUT PORTS
0211 8D8403            STA      0384H    ;SET CURRENT LAMP TO ZERO
0214 8D0498            STA      9804H
0217 8D0498            STA      9804H    ;PORT 14
021A 8D0498            STA      9804H
021D 8D0498            STA      9804H
0220 8D0498            STA      9804H
0223 8D0498            STA      9804H    ;PORT 10
0226 8D0498            STA      9804H    ;ALL THESE ARE ACTUALLY
0229 8D0498            STA      9804H    ;EACH PORT ADDRESS
022C 8D0498            STA      9804H
022F 8D0498            STA      9804H
0232 8D0498            STA      9804H    ;PORT 5
0235 8D0498            STA      9804H
0238 8D0498            STA      9804H
023B 8D0498            STA      9804H
023E 8D0498            STA      9804H
0241 8D0498            STA      9804H    ;PORT 0
                 ;THERE IS AN LED ON THIS BIT.. IF ON, THERE IS TROUBLE
0244 A980              LDA      #80H     ;TURN ON TROUBLE BIT
0246 8D8503            STA      0385H    ;SAVE IN MIRROR
0249 8D0598            STA      9805H    ;SAVE IN PORT
                 ;ALL ARRAYS IN RAM ARE SET TO ZERO
024C A900      RESET:  LDA      #00H     ;ZERO ARRAYS
024E AA                TAX
024F CA        MIRROR: DEX               ;START LOOP, PORT MIRRORS
0250 9500              STA      00H,X
0252 D0FB              BNE      MIRROR
0254 A280              LDX      #80H
0256 CA        FLAGS:  DEX               ;START LOOP, INCREMENT FLAGS
0257 9D0003            STA      0300H,X
025A D0FA              BNE      FLAGS
025C A200              LDX      #00H     ;JUST IN CASE
025E CA        LEVELS: DEX               ;START LOOP-OUTPUT
                                         ; LEVELS & SETPOINTS
025F 9D0002            STA      0200H,X
0262 D0FA              BNE      LEVELS   ;END ARRAY ZERO
                 ;THE UART WILL BE SET UP,
                 ; AND READ A COUPLE OF TIMES TO CLEAR
0264 A90F              LDA      #0FH     ;INITIALIZE UART
0266 8D0198            STA      9801H    ;SET CONTROL BITS
0269 AD0198            LDA      9801H    ;READ UART
026C AD0198            LDA      9801H    ;READ UART
026F AD0098            LDA      9800H    ;READ UART STATUS
0272 2938              AND      #38H     ;MASK FOR STATUS BITS
0274 F003              BEQ      NMI      ;ALL OK IF ZERO
0276 18                CLC
```

```
0277 9087                BCC     START       ;START OVER
                ;WE CAN NOW ALLOW NMI TO TAKE PLACE SO WE WILL CHANGE
                ;THE BIT PATTERNS
0279 58         NMI:     CLI                 ;ALLOW INTERRUPTS
027A A900                LDA     #00H
027C 8D8003              STA     0380H       ;BYTE MUST BE 00
027F A955                LDA     #55H
0281 8D8103              STA     0381H       ;BYTE MUST BE 55
0284 A9AA                LDA     #0AAH
0286 8D8203              STA     0382H       ;BYTE MUST BE AA
                                             ;NMI IS NOW ENABLED
                ;*****************************************
                ;***** THIS IS THE START OF THE MAIN LOOP *****
                ;*****************************************

0289 A280       AGAIN:   LDX     #80H        ;START WITH LAMP 128
028B A980                LDA     #80H        ;MASK FOR TROUBLE BIT
028D 4D8503              EOR     0385H       ;INVERT TROUBLE BIT OF MIRROR
0290 8D8503              STA     0385H       ;SAVE MIRROR
0293 8D0598              STA     9805H       ;TRANSFER TO OUTPUT
0296 CA         LOOPM:   DEX                 ;LAMP COUNT
0297 AD0098              LDA     9800H       ;CHECK FOR GO SIG.
029A 2907                AND     #07H        ;MASK FOR D0, D1, D2
029C F022                BEQ     LOOPM1      ;IF OK CONT.
029E 2901                AND     #01H        ;IS SPEED SIGNAL ON?
02A0 F00E                BEQ     LOOP2       ;SPEED SIG IS ON IF ZERO
02A2 AD8503     OFFR:    LDA     0385H       ;GET MIRROR
02A5 29F8                AND     #0F8H       ;TURN OFF ALL
02A7 8D8503              STA     0385H       ;SAVE MIRROR
02AA 8D0598              STA     9805H       ;SAVE OUTPUT
02AD 18                  CLC
02AE 909C                BCC     RESET
02B0 AD8503     LOOP2:   LDA     0385H       ;GET MIRROR
02B3 0904                ORA     #04H        ;MAKE SURE FAN IS ON
02B5 29FC                AND     #0FCH       ;CONTACTORS OFF
02B7 8D8503              STA     0385H       ;SAVE MIRROR
02BA 8D0598              STA     9805H       ;SAVE OUTPUT
02BD 18                  CLC
02BE 908C                BCC     RESET       ;ALMOST START OVER IF [OK]
02C0 AD8503     LOOPM1:  LDA     0385H       ;GET OUTPUT MIRROR
02C3 0907                ORA     #07H        ;TURN ON CONTACTORS
02C5 8D8503              STA     0385H       ;SAVE MIRROR
02C8 8D0598              STA     9805H       ;SAVE OUTPUTS
02CB BD0002              LDA     0200H,X     ;GET SETPOINT
02CE DD8002              CMP     0280H,X     ;CALCULATE SETPOINT-OUTPUT LEVEL
02D1 F051                BEQ     COUNT       ;ALL IS NORMAL,
                                             ; LET'S GET OUT OF HERE
02D3 1006                BPL     RAMP        ;GO TO RAMP IF SETPOINT IS LARGER
02D5 9D8002              STA     0280H,X     ;CHANGE OUTPUT TO SETPOINT
                                             ;IF SETPOINT IS LESS
02D8 18                  CLC
02D9 900D                BCC     UPDATE      ;GOTO UPDATE OUTPUT
02DB BD0003     RAMP:    LDA     0300H,X     ;CHECK INCREMENT FLAG
02DE F044                BEQ     COUNT       ;CAN'T DO ANYTHING NOW,
                                             ; WE'RE OTTA HERE
```

```
02E0 FE8002            INC     0280H,X    ;INCREASE OUTPUT BY ONE
02E3 A900              LDA     #00H
02E5 9D0003            STA     0300H,X    ;CLEAR THE INCREMENT FLAG
             ;UPDATE OUTPUTS
02E8 BD8002   UPDATE:  LDA     0280H,X    ;GET THE CURRENT OUTPUT LEVEL
02EB 0A                ASL     A
02EC 0A                ASL     A
02ED 0A                ASL     A
02EE 0A                ASL     A          ;THIS PUTS POWER LEVEL IN THE
                                          ;HIGH ORDER NIBBLE
                                          ;NOW WE CAN PULL OUT THE
02EF A8                TAY                ;CORRECT BIT PATTERN
02F0 B900F1   POWER:   LDA     0F100H,Y
02F3 3D80F0            AND     0F080H,X   ;MASK FOR CORRECT BIT
02F6 48                PHA                ;PUSH ON THE STACK,
                                          ; COUNT 0 FIRST - COUNT F LAST
02F7 C8                INY                ;NEXT COUNT
02F8 98                TYA                ;LETS CHECK THE COUNT FIRST
02F9 290F              AND     #0FH       ;MASK TO LOW ORDER NIBBLE
                                          ;IF ZERO, WE DONE
02FB D0F3              BNE     POWER      ;IF NOT ZERO, KEEP GOING
             ;NOW UPDATE THE MIRROR
02FD A9F0              LDA     #0F0H      ;START WITH COUNT F
02FF 7D00F0            ADC     0F000H,X   ;OFFSET BY PORT NUMBER
0302 A8                TAY                ;GET THAT ADDRESS INTO Y
0303 68       COUNT1:  PLA                ;GET COUNT FROM STACK
                                          ; F FIRST, 0 LAST
0304 F009              BEQ     OFF        ;BRANCH IF THE BIT TURNS OFF
0306 190000            ORA     00H,Y      ;GET CURRENT BIT PATTERN PLUS ONE
                                          ; BIT ON FOR SURE
0309 990000            STA     00H,Y      ;SAVE THE NEW PATTERN
030C 18                CLC
030D 900B              BCC     INDEX      ;NOTHING ELSE TO DO
030F BD80F0   OFF:     LDA     0F080H,X   ;GET THE BIT
                                          ; WE HAVE TO TURN OFF
0312 49FF              EOR     #0FFH      ;ALL ONES EXCEPT ONE 0, RIGHT?
0314 390000            AND     00H,Y      ;RETAIN CURRENT, EXCEPT ONE BIT IS
                                          ; OFF FOR SURE
0317 990000            STA     00H,Y      ;SAVE THE NEW PATTERN
031A 98       INDEX:   TYA                ;LETS GET THE INDEX BACK
031B 69F0              ADC     #256-16    ;BY ADDING F0 WE ACTUALLY
                                          ; SUBTRACT 10, RIGHT?
031D A8                TAY                ;PUT THE INDEX BACK
031E 29F0              AND     #0F0H      ;WE ARE FINISHED IF THE ACCUMULATOR
                                          ; HAS F0 IN IT
0320 C9F0              CMP     #0F0H      ;THAT'S IT
0322 D0DF              BNE     COUNT1     ;GOTO PULL NEXT FROM STACK
0324 8A       COUNT:   TXA                ;LET'S LOOK AT THAT LAMP COUNT
0325 F003              BEQ     GO
0327 4C96F2            JMP     LOOPM + 0F000H   ;NEXT LAMP 032A 4C89F2   GO:      JMP     AGAIN + 0F000H   ;LOAD HER UP
                                                ; AND START OVER AGAIN
```

```
032D 5445432053          DFB     "TEC SYSTEMS - 05/16/89 - R. E. TRELEVEN "
0355 00                  DFB     0

0356                     INCL    "IRQ.GBP"
;*************************************************
;******************** IRQ *************************
;*************************************************

;INTERUPT REQUEST ROUTINE FOR GREATER BUFFALO

0400                     ORG     BASE + 00400H

;BETTER SAVE EVERYTHING
0400 48                  PHA                     ;PUSH ACCUMULATOR
0401 8A                  TXA                     ;GET X REG
0402 48                  PHA                     ;PUSH X
0403 98                  TYA                     ;GET Y REG
0404 48                  PHA                     ;PUSH Y

;THE ONLY THING THAT CAN CAUSE AN INTERRUPT IS
             ; UART RECEIVE
0405 AD8503              LDA     0385H           ;GET BIT MIRROR
0408 4920                EOR     #20H            ;INVERT IRQ BIT
040A 8D8503              STA     0385H           ;SAVE MIRROR
040D 8D0598              STA     9805H           ;SAVE OUTPUT
0410 2C0098              BIT     9800H           ;TEST THE RX STATUS (OVERFLOW)
0413 5054                BVC     NXTIRQ          ;NEXT INTERUPT IF NOT THIS ONE
0415 AD0098              LDA     9800H           ;GET STATUS
0418 AE8403              LDX     0384H           ;GET CURRENT LAMP INTO X REG.
041B 2938                AND     #38H            ;MASK FOR ERROR BITS
041D F004                BEQ     LETTER          ;JUMP IF OK
041F 78                  SEI                     ;SHOULD BE SET BUT JUST IN CASE
0420 4C00F2              JMP     0F200H          ;START THE WHOLE THING OVER
0423 AD0198      LETTER: LDA     9801H           ;GET THE UART RX DATA
0426 297F                AND     #7FH            ;MASK FOR 7 BITS
0428 C941                CMP     #"A"            ;CALCULATE CHAR-"A"
042A 300F                BMI     NUMBER          ;LESS THAN "A"
042C C951                CMP     #"Q"            ;CALCULATE CHAR-"Q" HIGHEST
                                                 ; IT CAN BE IS "P"
042E 102B                BPL     CHEK_R          ;CHARTER IS OUT OF RANGE IF PLUS
0430 69BF                ADC     #256-"A"        ;ADDING BF IS LIKE
                                                 ; SUBTRACTING 41H (65)
             ;ACCUMULATOR NOW HOLDS THE NUMBER 0 TO F
0432 0A                  ASL     A
0433 0A                  ASL     A
0434 0A                  ASL     A               ;ACCUMULATOR NOW HOLDS LAMP NUMBER
                                                 ; (MULTIPLE OF 8)
0435 8D8403              STA     0384H           ;NEW LAMP NUMBER
0438 18                  CLC                     ;BETTER CLEAR IT JUST IN CASE
0439 902E                BCC     NXTIRQ          ;CARRY BETTER BE CLEAR!!
043B C930       NUMBER:  CMP     #"0"            ;CALCULATE CHAR-"0"
043D 3013                BMI     PLUS            ;BRANCH IF NOT A NUMBER
```

```
043F C940              CMP     #"@"      ;CALCULATE CHAR-"@"
0441 1026              BPL     NXTIRQ    ;CHARACTER IS "@", IT CAN'T BE
                                         ; "A" OR HIGHER, RIGHT?
0443 69D0              ADC     #256-"0"  ;ADDING D0 IS LIKE SUBTRACTING
                                         ; 30H (48)
                ;ACCUMULATOR NOW HOLDS THE POWER LEVEL
0445 9D0002            STA     0200H,X   ;SAVE SETPOINT OF CURRENT LAMP
0448 E8        NEXT:   INX               ;NEXT LAMP
0449 8A        CHECK:  TXA               ;BRING TO ACCUMULATOR
044A 297F              AND     #7FH      ;THIS WILL FORCE A ROLLOVER
                                         ; AT 80 TO 00
044C 8D8403            STA     0384H     ;SAVE CURRENT LAMP
044F 18                CLC
0450 9017              BCC     NXTIRQ    ;BETTER BE PLUS
0452 C92B      PLUS:   CMP     #"+"      ;CHECK FOR "+"
0454 F0F2              BEQ     NEXT      ;JUST INCREMENT
0456 CA                DEX               ;WE'LL DO THIS JUST IN CASE
0457 C92D              CMP     #"-"      ;CHECK FOR "-"
0459 F0EE              BEQ     CHECK     ;DON'T INCREMENT, JUST CHECK
                                         ; FOR ROLL OVER IF "-"
045B C952      CHEK_R: CMP     #"R"      ;CHECK FOR "R" OR RESET
045D D00A              BNE     NXTIRQ    ;THAT SHOULD DO IT
045F A900              LDA     #00H      ;PREPARE TO XERO SET POINTS
0461 A27F              LDX     #07FH     ;LAMP # 127
0463 9D0002    CHK_R1: STA     0200H,X   ;ZERO SET POINT
0466 CA                DEX               ;NEXT LAMP
0467 10FA              BPL     CHK_R1    ;LAST LAMP?
0469 EA        NXTIRQ: NOP               ;
046A EA                NOP               ;
                ;THAT SHOULD DO IT
046B 68        DONE:   PLA               ;GET Y FROM STACK
046C A8                TAY               ;RESTORE Y
046D 68                PLA               ;GET X
046E AA                TAX               ;RESTORE X
046F 68                PLA               ;GET ACCUMULATOR
0470 58                CLI               ;READY FOR NEXT TIME
0471 40                RTI               ;WE'RE OTTA HERE 0472 5445432053        DFB     "TEC SYSTEMS - 05/16/89 - R. E. TRELEVEN "
049A 00                DFB     0

049B                   INCL    "NMI.GBP"
;************************************************
;***************** NMI **************************
;************************************************

;NON-MASKABLE INTERRUPT ROUTINE FOR GREATER BUFFALO

0600                   ORG     BASE + 00600H
                ;BETTER SAVE EVERYTHING
0600 48                PHA               ;PUSH ACCUMULATOR
```

```
0601 8A              TXA                  ;GET X REG
0602 48              PHA                  ;PUSH X
0603 98              TYA                  ;GET Y REG
0604 48              PHA                  ;PUSH Y
                ;BETTER CHECK TO SEE IF WE CAN PROCEED
0605 A900            LDA      #00H
0607 CD8003          CMP      0380H       ;IS THIS BYTE 00
060A D06B            BNE      ENDH        ;ALL DONE IF NOT EQUAL
060C A955            LDA      #55H
060E CD8103          CMP      0381H       ;IS THIS BYTE 55
0611 D064            BNE      ENDH        ;WE GONE
0613 A9AA            LDA      #0AAH
0615 CD8203          CMP      0382H       ;IS THIS BYTE AA
0618 D05D            BNE      ENDH        ;IF EQUAL TO ZERO AT
                                          ; THIS POINT, WE MUST BE OK!
061A AD8303          LDA      0383H       ;GET CURRENT LAMP PHASE
061D 290F            AND      #0FH        ;MASK FOR LOW ORDER NIBBLE
061F 0A              ASL      A
0620 0A              ASL      A
0621 0A              ASL      A
0622 0A              ASL      A           ;COUNT IS NOW IN HIGH ORDER NIBBLE
0623 AA              TAX                  ;HOLD COUNT IN X REG FOR INDEXING
                ;EACH PORT IS DONE SEPARATELY TO ENABLE PORTS
                ; TO BE ANYWHERE IN MEMORY
                ;THEY DON'T HAVE TO BE SEQUENTIAL... MEMORY'S CHEAP
0624 B50F            LDA      15,X        ;GET PORT F PATTERN
0626 8D0698          STA      9806H       ;STORE IN PORT F...
                                          ;JUST A DUMMY FOR NOW
0629 B50E            LDA      14,X        ;GET PORT E PATTERN
062B 8D0698          STA      9806H       ;STORE IN PORT E
062E B50D            LDA      13,X        ;GET PORT D PATTERN
0630 8D0698          STA      9806H       ;STORE IN PORT D
0633 B50C            LDA      12,X        ;GET PORT C PATTERN
0635 8D0698          STA      9806H       ;STORE IN PORT C
0638 B50B            LDA      11,X        ;GET PORT B PATTERN
063A 8D0698          STA      9806H       ;STORE IN PORT B
063D B50A            LDA      10,X        ;GET PORT A PATTERN
063F 8D0698          STA      9806H       ;STORE IN PORT A
0642 B509            LDA      9,X         ;GET PORT 9 PATTERN
0644 8D0698          STA      9806H       ;STORE IN PORT 9
0647 B508            LDA      8,X         ;GET PORT 8 PATTERN
0649 8D0698          STA      9806H       ;STORE IN PORT 8
064C B507            LDA      7,X         ;GET PORT 7 PATTERN
064E 8D0698          STA      9806H       ;STORE IN PORT 7
0651 B506            LDA      6,X         ;GET PORT 6 PATTERN
0653 8D0698          STA      9806H       ;STORE IN PORT 6
0656 B505            LDA      5,X         ;GET PORT 5 PATTERN
0658 8D0698          STA      9806H       ;STORE IN PORT 5
065B B504            LDA      4,X         ;GET PORT 4 PATTERN
065D 8D0698          STA      9806H       ;STORE IN PORT 4
0660 B503            LDA      3,X         ;GET PORT 3 PATTERN
0662 8D0698          STA      9806H       ;STORE IN PORT 3
0665 B502            LDA      2,X         ;GET PORT 2 PATTERN
0667 8D0698          STA      9806H       ;STORE IN PORT 2
066A B501            LDA      1,X         ;GET PORT 1 PATTERN
```

```
066C 8D0698              STA     9806H       ;STORE IN PORT 1..
                                             ; STILL A DUMMY
066F B500                LDA     0,X         ;GET PORT 0 PATTERN
0671 8D0498              STA     9804H       ;STORE IN PORT 0...
                                             ;.THIS IS A REAL ADDRESS
                  ;THIS IS THE HALFWAY POINT FOR ENDH
0674 18                  CLC
0675 9003                BCC     ZZZ
0677 18         ENDH:    CLC
0678 901F                BCC     END         ;FROM HERE WE CAN BRANCH
                  ;NOW WE WILL INCREMENT AND CHECK FOR TIME TO SET FLAGS
067A EE8303     ZZZ:     INC     0383H
067D 101A                BPL     END         ;IF STILL PLUS, DON'T DO ANYTHING
067F AD8503              LDA     0385H       ;GET MIRROR
0682 4940                EOR     #40H        ;INVERT NMI BIT
0684 8D8503              STA     0385H       ;SAVE MIRROR
0687 8D0598              STA     9805H       ;SAVE OUTPUT
068A A900                LDA     #00H
068C 8D8303              STA     0383H       ;FRESH START FOR PHASE COUNTER
                  ;NOW WE HAVE TO SET ALL THE INCREMENT FLAGS
068F A27F                LDX     #7FH        ;START WITH LAMP 127
0691 A9FF                LDA     #0FFH
0693 9D0003     LOOPN:   STA     0300H,X     ;SET FLAG
0696 CA                  DEX                 ;NEXT FLAG
0697 10FA                BPL     LOOPN       ;STOP WHEN X REG IS FF
                  ;THAT SHOULD DO IT
0699 68         END:     PLA                 ;GET Y FROM STACK
069A A8                  TAY                 ;RESTORE Y
069B 68                  PLA                 ;GET X
069C AA                  TAX                 ;RESTORE X
069D 68                  PLA                 ;GET ACCUMULATOR
069E 58                  CLI                 ;CLEAR INTERRUPT BIT
069F 40                  RTI                 ;WE'RE OTTA HERE

06A0 5445432053          DFB     "TEC SYSTEMS - 05/16/89 - R. E. TRELEVEN "
06C8 00                  DFB     0

OFFA                     ORG     BASE + 0FFAH ;GET READY TO SET UP VECTORS

OFFA 00F6                DFB     LOW{NMIVEC},HIGH{NMIVEC}
OFFC 00F2                DFB     LOW{RESVEC},HIGH{RESVEC}
OFFE 00F4                DFB     LOW{IRQVEC},HIGH{IRQVEC}

END
```

| | | | | | |
|---|---|---|---|---|---|
| 0289 | AGAIN   | 0000 | BASE   | 0449 | CHECK  |
| 045B | CHEK_R  | 0463 | CHK_R1 | 0324 | COUNT  |
| 0303 | COUNT1  | 046B | DONE   | 0699 | END    |
| 0677 | ENDH    | 0256 | FLAGS  | 032A | GO     |
| 031A | INDEX   | F400 | IRQVEC | 0423 | LETTER |
| 025E | LEVELS  | 02B0 | LOOP2  | 0296 | LOOPM  |
| 02C0 | LOOPM1  | 0693 | LOOPN  | 024F | MIRROR |
| 0448 | NEXT    | 0279 | NMI    | F600 | NMIVEC |
| 043B | NUMBER  | 0469 | NXTIRQ | 0000 | O      |
| 030F | OFF     | 02A2 | OFF+   | 0452 | PLUS   |
| 02F0 | POWER   | 02DB | RAMP   | 024C | RESET  |
| F200 | RESVEC  | 0200 | START  | 02E8 | UPDATE |
| 00FF | X       | 067A | ZZZ    |      |        |

```
         |----|----|
FFFF     | F4 | 00 | FFFE    IRQ
FFFD     | F2 | 00 | FFFC    Reset
FFFB     | F6 | 00 | FFFA    NMI
         |----|----|
F800     | FF | FF | FFF9    NOT USED
         |---------|
F600     | NMI HANDLER      | F7FF
F400     | IRQ HANDLER      | F5FF
F200     | MAIN PROGRAM     | F3FF
         |---------------------------------------------|
F1F0     | FF FF FF FF FF FF FF FF FF FF FF FF FF FF FF 00 | F1FF |
F1E0     | FF FF FF FF FF FF FF 00 FF FF FF 00 FF FF FF 00 | F1EF |
F1D0     | FF FF FF FF FF 00 FF FF 00 FF FF 00 FF FF FF 00 | F1DF |
F1C0     | FF FF FF 00 FF FF FF 00 FF FF 00 FF FF FF 00    | F1CF |
F1B0     | FF FF FF 00 FF FF 00 FF FF 00 FF FF 00 FF FF 00 | F1BF |
F1A0     | FF FF 00 FF FF FF 00 FF FF 00 FF FF 00 FF FF 00 | F1AF |
F190     | FF FF 00 FF FF 00 FF FF 00 FF FF 00 FF FF 00 FF | F1FE |
F180     | 00 FF 00 FF 00 FF 00 FF 00 FF 00 FF 00 FF 00 FF | F18F |   16 x 16
F170     | 00 00 FF 00 FF 00 FF 00 00 FF 00 FF 00 FF 00 FF | F17F |   POWER
F160     | 00 00 FF 00 FF 00 00 FF 00 FF 00 FF 00 00 FF    | F16F |   LEVEL
F150     | 00 00 00 FF 00 00 FF 00 00 FF 00 00 FF 00 00 FF | F15F |   BIT MAP
F140     | 00 00 00 FF 00 00 00 FF 00 00 00 FF 00 00 00 FF | F14F |
F130     | 00 00 00 00 00 FF 00 00 00 00 FF 00 00 00 00 FF | F13F |
F120     | 00 00 00 00 00 00 FF 00 00 00 00 00 00 00 00 FF | F12F |
F110     | 00 00 00 00 00 00 00 00 00 00 00 00 00 00 00 FF | F11F |
F100     | 00 00 00 00 00 00 00 00 00 00 00 00 00 00 00 00 | F10F |
         |---------------------------------------------|
F0F0     | 00 00 00 00 00 00 00 00 00 00 00 00 00 00 00 00 | F0FF |
F0E0     | 00 00 00 00 00 00 00 00 00 00 00 00 00 00 00 00 | F0EF |
F0D0     | 00 00 00 00 00 00 00 00 00 00 00 00 00 00 00 00 | F0DF |
F0C0     | 00 00 00 00 00 00 00 00 00 00 00 00 00 00 00 00 | F0CF |   128 BYTE
F0B0     | 00 00 00 00 00 00 00 00 00 00 00 00 00 00 00 00 | F0BF |   LAMP BIT
F0A0     | 00 00 00 00 00 00 00 00 00 00 00 00 00 00 00 00 | F0AF |   MASK
F090     | 00 00 00 00 00 00 00 00 00 00 00 00 00 00 00 00 | F09F |
F080     | 01 02 04 08 00 10 20 40 80 00 00 00 00 00 00 00 | F08F |
         |---------------------------------------------|
F070     | 00 00 00 00 00 00 00 00 00 00 00 00 00 00 00 00 | F07F |
F060     | 00 00 00 00 00 00 00 00 00 00 00 00 00 00 00 00 | F06F |
F050     | 00 00 00 00 00 00 00 00 00 00 00 00 00 00 00 00 | F05F |
F040     | 00 00 00 00 00 00 00 00 00 00 00 00 00 00 00 00 | F04F |   128 BYTE
F030     | 00 00 00 00 00 00 00 00 00 00 00 00 00 00 00 00 | F03F |   LAMP PORT
F020     | 00 00 00 00 00 00 00 00 00 00 00 00 00 00 00 00 | F02F |   NUMBER
F010     | 00 00 00 00 00 00 00 00 00 00 00 00 00 00 00 00 | F01F |
F000     | 00 00 00 00 00 00 00 00 00 00 00 00 00 00 00 00 | F00F |
         |---------------------------------------------|
9808     |         | EFFF    NOT USED
```

|      | READ | WRITE |
|------|------|-------|
| 9807 |      |       |
| 9806 |      |       |
| 9805 |      | STATUS FLAGS - (NOTE 3) |
| 9804 |      | LAMP PORT 0 - TS2 |

```
9803 |
9802 |
9801 | RX DATA & RESET              | CTRL LOAD (NOTE 1).
9800 | UART STATUS (NOTE 2)         | TX LOAD
     |------------------------------|---------
0400 | NOT USED | 97FF
     |---------------------
0381 | UNUSED RAM                   | 03FF
0386 |
     |------------------------------|
0385 | TROUBLE BIT MIRROR (9805)    |
0384 | CURRENT LAMP COUNTER         |
0383 | LAMP PHASE COUNTER           |
0380 | FF FF FF  or  00 55 AA       | 0382   NMI CHECK
0300 | INCREMENT FLAGS              | 037F
0280 | OUTPUT LEVELS                | 02FF
0200 | SET POINTS                   | 027F
     |------------------------------|
0100 | STACK                        | 01FF
     |------------------------------|
00F0 | 16 PORTS - COUNT "F"         | 00FF
00E0 | 16 PORTS - COUNT "E"         | 00EF
00D0 | 16 PORTS - COUNT "D"         | 00DF
00C0 | 16 PORTS - COUNT "C"         | 00CF
00B0 | 16 PORTS - COUNT "B"         | 00BF
00A0 | 16 PORTS - COUNT "A"         | 00AF
0090 | 16 PORTS - COUNT "9"         | 009F   PORT
0080 | 16 PORTS - COUNT "8"         | 008F   MIRRORS
0070 | 16 PORTS - COUNT "7"         | 007F
0060 | 16 PORTS - COUNT "6"         | 006F
0050 | 16 PORTS - COUNT "5"         | 005F
0040 | 16 PORTS - COUNT "4"         | 004F
0030 | 16 PORTS - COUNT "3"         | 003F
0020 | 16 PORTS - COUNT "2"         | 002F
0010 | 16 PORTS - COUNT "1"         | 001F
0000 | 16 PORTS - COUNT "0"         | 000F
     |------------------------------|
```

NOTES:      (1)CONTROL 9801          (2)INPUTS 9800            (3)OUTPUTS 9805 0385

| | | | |
|---|---|---|---|
| D0 | 1 EVEN PARITY | [10% SPEED] | LAMP #1 CONTACTOR |
| D1 | 1 CHARACTER LENGTH 1 | [P.S.LAMP #1] | LAMP #2 CONTACTOR |
| D2 | 1 CHARACTER LENGTH 2 | [P.S.LAMP #2] | FAN STARTER |
| D3 | 1 STOP BIT SELECT | PARITY ERROR | NOT USED |
| D4 | 0 PARITY INHIBIT | FRAMING ERROR | NOT USED |
| D5 | NOT USED | OVERRUN ERROR | IRQ TOGGLE |
| D6 | NOT USED | DATA RECEIVED | NMI TOGGLE |
| D7 | NOT USED | TRANSMIT BUFFER EMPTY | RESET/TROUBLE |

```
10 OPEN"o",#1,"e:\x
20 DIM D(4095)
30 A=65:R=82:Z=48:CR=13:LF=10:SP=32:NUL=12
40 REM ***** sp ***** ******
50 FOR N=0 TO 1535   spaces
60 D(N)=SP+NUL
70 NEXT N
80 REM ********* a or r *****
90 FOR N=1536 TO 2047
100 IF N AND 256 THEN D(N)=R+NUL:GOTO 120
110 D(N)=A
120 NEXT N
130 FOR N= 2048 TO 2559
140 IF N AND 256 THEN D(N)=R+NUL:GOTO 160
150 D(N)=(NOT N AND 15)+Z
160 NEXT N
170 FOR N=2560 TO 3071
180 IF N AND 256 THEN D(N)=R:GOTO 200
190 D(N)=(NOT N AND 240)/16+Z
200 NEXT N
210 FOR N=3072 TO 3583
220 D(N)=CR
230 NEXT N
240 FOR N=3584 TO 4095
250 D(N)=LF
260 NEXT N
270 FOR N=0 TO 4095
280 PRINT#1,CHR$(D(N));
290 NEXT N
300 CLOSE #1
```

I claim:

1. Infrared drying system comprising:
   a. traveling web of material and means for supporting said web;
   b. sensing means supported above said web and traveling across the width of said web;
   c. means for generating profile signals of the output of said sensing means across the width of said web with respect to a set point;
   d. means for generating a plurality of control signals, for switching a power controller including storage means, said storage means including an algorithm for switching power to an infrared lamp;
   e. infrared module means positioned above said web in proximity to said sensing means; and,
   f. power controllers connected between a source of power and each of said infrared lamps and to each of said control signals for controlling each of said infrared means.

2. Infrared drying system comprising:
   a. sensing means for generating a signal movably positioned on a transport means for traveling across the width of a traveling web;
   b. processor means including means for processing said signal and generating a profile signal with respect to the width of said web;
   c. means for storing an algorithm of moisture content and for generating control signals in response to profile signals; and,
   d. controller means for switching to at least one of a plurality of power means powering said heater means for correcting moisture content of a predetermined section of said web.

3. A process of drying a traveling web of material comprising:
   a. positioning a plurality of independently controlled drying elements at fixed positions across the width of said traveling web of material wherein each of said plurality of said independently controlled drying elements corresponds to a different one of a plurality of divisions of said width of said traveling web of material;
   b. establishing a moisture profile comprising a set point moisture for each of said divisions;
   c. sensing moisture of each of said plurality of division of said width;
   d. increasing the intensity of each of said plurality of said independently controlled drying elements whenever said corresponding one of said plurality of divisions of said width of said traveling web of material is sensed to have a moisture greater than said set point moisture; and,
   e. decreasing the intensity of each of said plurality of said independently controlled drying elements whenever said corresponding one of said plurality of divisions of said width of said traveling web of material is sensed to have a moisture less than said set point moisture, 4. An apparatus for drying a traveling web of material comprising:
   a. means for establishing a set point moisture for each of a plurality of divisions across the width of said traveling web;
   b. means for sensing the moisture content of said traveling web of material as a function of the distance across the width of said traveling web of material;
   c. a plurality of drying elements wherein each of said plurality of drying elements is fixedly positioned to dry a different portion of said width of said traveling web of material; and,
   d. means responsively coupled to said sensing means and said plurality of drying elements for increasing the intensity of a one of said plurality of drying elements corresponding to said different portion of said width of said traveling web of material if said sensing indicates that said different portion of said width of said traveling web of material is greater than said set point moisture.

5. An apparatus for drying a traveling web of material according to claim 4 further comprising means responsively coupled to said sensing means, said plurality of drying elements, and said increasing means for decreasing the intensity of said one of said plurality of drying elements corresponding to said different portion of said width of said traveling web of material if said sensing indicates that said different portion of said width of said traveling web of material is less than said set point moisture.

6. An apparatus according to claim 5 further comprising a plurality of reflector assembly means positioned on each side of said traveling web of material.

7. An apparatus according to claim 6 wherein said plurality of drying elements are fixedly attached to said reflector assembly means.

8. An apparatus according to claim 7 wherein said plurality of dry elements comprises a plurality of infrared lamps.

9. An apparatus according to claim 8 wherein said increasing means and said decreasing means further comprises a computer.

10. An apparatus according to claim 8 wherein said increasing means and said decreasing means further comprises hardwired logic circuitry.

11. Drying system comprising:
   a. traveling web of material and means for supporting said web;
   sensing means supported above said web and traveling across the width of said web;
   c. means for generating profile signals of the output of said sensing means across the width of said web with respect to a set point;
   d. means for generating a plurality of control signals for switching a power controller including storage means, said storage means including at least one algorithm for switching power to an infrared lamp;
   e. energy module means positioned above said web in proximity to said sensing means; and,
   f. power controllers connected between a source of power and each of said energy lamps and to each of said control signals for controlling each of said infrared means.

12. Drying system comprising:
   a. sensing means for generating a signal movably positioned on a transport means for traveling across the width of a traveling web;
   b. processor means including means for processing said signal and generating a profile signal with respect to the width of said web;
   c. means for storing at least one algorithm of moisture content and for generating control signals in response to profile signals; and,
   d. controller means for switching power to at least one of a plurality of power to power to heating means for correcting moisture content of a predetermined section of said web.

* * * * *

UNITED STATES PATENT AND TRADEMARK OFFICE
CERTIFICATE OF CORRECTION

PATENT NO. : 5,010,659
DATED : April 30, 1991
INVENTOR(S) : Robert E. Treleven

It is certified that error appears in the above-identified patent and that said Letters Patent is hereby corrected as shown below:

Cover page, Application No. should read --404,895--.

Signed and Sealed this

Sixteenth Day of March, 1993

Attest:

STEPHEN G. KUNIN

*Attesting Officer*       Acting Commissioner of Patents and Trademarks